US008325414B2

(12) United States Patent
Guiney

(10) Patent No.: US 8,325,414 B2
(45) Date of Patent: Dec. 4, 2012

(54) APPARATUS FOR SINGLE-HANDED CONTROL OF MICROSCOPE FUNCTIONS

(75) Inventor: Patrick Guiney, Concord, MA (US)

(73) Assignee: Cytyc Corporation, Marlborough, MA (US)

( * ) Notice: Subject to any disclaimer, the term of this patent is extended or adjusted under 35 U.S.C. 154(b) by 520 days.

(21) Appl. No.: 12/335,440

(22) Filed: Dec. 15, 2008

(65) Prior Publication Data

US 2009/0168161 A1 Jul. 2, 2009

Related U.S. Application Data

(60) Provisional application No. 61/017,154, filed on Dec. 27, 2007.

(51) Int. Cl.
*G02B 21/26* (2006.01)

(52) U.S. Cl. ........................................ 359/391; 359/393

(58) Field of Classification Search .................. 359/391, 359/393

See application file for complete search history.

(56) References Cited

U.S. PATENT DOCUMENTS

| | | | | |
|---|---|---|---|---|
| 3,826,559 A | | 7/1974 | Berliner et al. | |
| 5,602,674 A | * | 2/1997 | Weissman et al. | 359/393 |
| 5,712,725 A | * | 1/1998 | Faltermeier et al. | 359/392 |
| 5,790,308 A | * | 8/1998 | Kamentsky | 359/393 |
| 5,900,708 A | * | 5/1999 | Den Engelse et al. | 318/640 |
| 6,018,415 A | * | 1/2000 | Woo et al. | 359/393 |
| 7,083,106 B2 | | 8/2006 | Albany | |
| 7,136,223 B2 | * | 11/2006 | Roeth et al. | 359/393 |
| 7,324,275 B2 | | 1/2008 | Bonaventura et al. | |
| 2003/0021017 A1 | * | 1/2003 | Eijsackers et al. | 359/368 |
| 2003/0179445 A1 | * | 9/2003 | Maenle et al. | 359/368 |
| 2004/0254738 A1 | | 12/2004 | Zahniser et al. | |
| 2005/0128575 A1 | | 6/2005 | Bonaventura et al. | |
| 2007/0133085 A1 | | 6/2007 | Scampini | |
| 2007/0139638 A1 | | 6/2007 | Wolpert et al. | |

FOREIGN PATENT DOCUMENTS

| | | |
|---|---|---|
| CN | 1651963 A | 8/2005 |
| DE | 3037710 | 5/1982 |
| DE | 102004056531 | 6/2005 |
| GB | 1168787 | 10/1969 |

OTHER PUBLICATIONS

PCT International Search Report and Written Opinion for PCT/US2008/086878, Applicant CYTYC Corporation, Forms PCT/ISA/210, 220, and 237, dated Mar. 31, 2009 (17 pages).

(Continued)

*Primary Examiner* — Frank Font
(74) *Attorney, Agent, or Firm* — Vista IP Law Group LLP

(57) ABSTRACT

Apparatus for single-handed control of a microscope are disclosed. In one embodiment, a first controller, such as a first rotary controller, is configured for manipulation by a hand of a user to adjust a position of a microscope stage. Another controller, such as a second rotary controller, is configured and arranged relative to the first rotary controller for manipulation by an extended finger of the same hand to review, e.g., scroll through, previously identified portions of a biological specimen while the user's first hand may or may not remain in contact with the first rotary controller. In this manner, the user may continue to review the previously identified specimen portions without having to look away from the microscope.

14 Claims, 21 Drawing Sheets

OTHER PUBLICATIONS

Office Action for Related CN Application No. 200880123187.7, filed on Dec. 15, 2008, mailed on Jun. 13, 2011, with Translation (10 pages).

Office Action mailed Apr. 20, 2012, in corresponding Chinese Patent Application No. 200880123187.7, filed Dec. 15, 2008; and the English Translation thereof.

Response filed Feb. 2, 2012, in corresponding European Patent Application No. 08869067.2-2213, filed Dec. 15, 2008.

Office Action mailed Dec. 23, 2011, in corresponding European Patent Application No. 08869067.2-2213, filed Dec. 15, 2008.

Response filed Sep. 14, 2010, in corresponding European Patent Application No. 08869067.2-2213, filed Dec. 15, 2008.

European Patent Office Communication Pursuant to Rule 161(1) and 162 mailed Aug. 5, 2010, in corresponding European Patent Application No. 08869067.2-2213, filed Dec. 15, 2008.

* cited by examiner

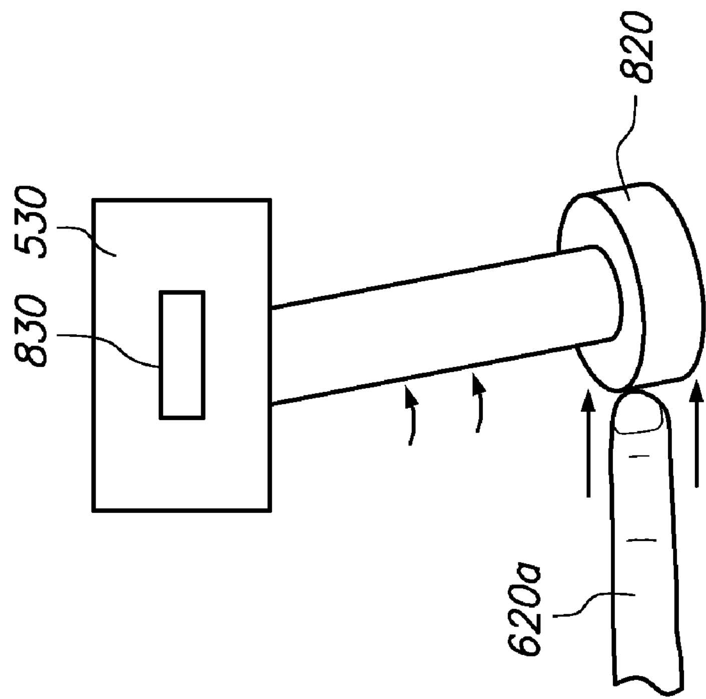
FIG. 12
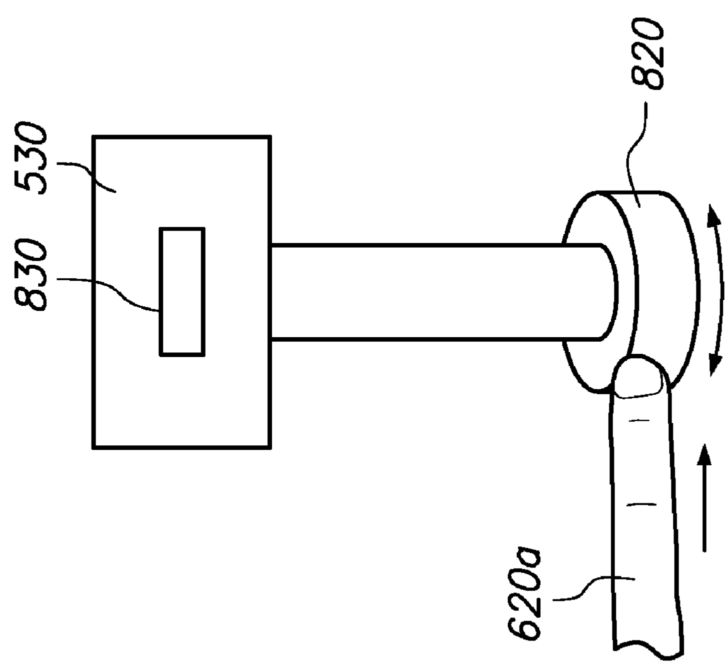

APPARATUS FOR SINGLE-HANDED CONTROL OF MICROSCOPE FUNCTIONS

RELATED APPLICATION DATA

The present application claims the benefit under 35 U.S.C. §119 to U.S. provisional patent application Ser. No. 61/017,154, filed Dec. 27, 2007. The foregoing application is hereby incorporated by reference into the present application in its entirety.

FIELD OF THE INVENTION

The present inventions are related to apparatus for controlling microscopes, and in particular to single-handed microscope control apparatus.

BACKGROUND

In the medical industry, there is often a need for a laboratory technician, e.g., a cytologist, to review a cytological specimen for the presence of specified cell types. A typical cytological technique is a "Pap smear" test, which involves scraping cells from a woman's cervix and analyzing the cells in order to detect the presence of abnormal cells, a precursor to the onset of cervical cancer. Cytological techniques are also used to detect abnormal cells and diseases in other parts of the human body. Acquired cytological samples are often placed in solution and subsequently collected and transferred to a glass slide for viewing under magnification. Fixative and staining solutions are typically applied to cells on the glass slide, often called a cell smear, for facilitating examination and for preserving the specimen for archival purposes.

Prepared specimens are examined using a microscope, such as the microscope 100 generally illustrated in FIGS. 1A-B, which typically includes a stage 110 attached to a body or frame 101 and having a top surface 112 that supports a specimen slide 200 carrying a biological specimen 202 (e.g., as shown in FIG. 2). One or more control knobs are provided to allow the user to move the stage 110. As shown in FIGS. 1A-B, the microscope 100 may have a coaxial control knob 120 including a first knob 121 for moving the stage 110 in one direction (e.g., "x" direction) and a second knob 122 coaxial with the first knob 121 for moving the stage 110 in a different direction (e.g., "y" direction). A light source 130, such as a tungsten-halogen light source, is positioned below the stage 110 to illuminate the specimen 202. Objective lenses 140 form a magnified image of the specimen 202, and a cytologist may view the magnified image through an ocular lens 150. Focus adjustments may be made using another coaxial control knob 160 for adjusting the focus, e.g., moving the stage 110 in a "z" direction. A typical control knob 160 includes a first knob 161 that is used for fine focus or fine stage 110 adjustments in the "z" direction, and a second knob 162 that is used for coarse focus adjustments. Further aspects of microscope components are described in U.S. Publication No. 2007/0139638 A1, the contents of which are incorporated herein by reference.

Machine vision devices and automated systems have also been utilized to acquire and analyze images of biological specimens. One known automated system 300 shown in FIG. 3 includes an automated imaging microscope or station 310, a processing server 320 and an automated review station 330.

One known imaging station 310 includes a camera 312 that acquires images of a specimen 202 on a slide 200 supported by a motorized stage 314 and viewed through an imaging microscope 316 or "imaging scope" 316. Image data 318 generated by the camera 312 is provided to the server 320 that includes one or more processors 321-323 (generally referred to as processor 321) and a memory 324 for processing image data 318 and storing processing results, which are provided to the review station 330. In some automated screening systems, the processor 321 delineates between normal and abnormal or suspicious biological material within each specimen 202. That is, the processor 321 uses diagnostic information to determine the most pertinent biological objects and their locations (e.g., x-y coordinates) on the slide 200. In one system, for example, the server 320 processes image data 318 to identify "objects of interest" (OOIs) in the image data 318. OOIs may take the form of individual cells and cell clusters of the specimen 202. One or more OOIs 710 can be organized within a defined boundary or fields of view of Fields of Interest (FOI), which may be defined by various geometries to include different numbers of OOIs 710 and identified based on (x,y) coordinates. One known automated system identifies 22 FOIs. Further aspects of OOIs and FOIs are described in U.S. Pat. Nos. 7,083,106 and 2004/0254738, the contents of which are incorporated herein by reference.

The processor 321 may be configured to rank identified OOIs based on the degree to which certain cells or objects are at risk of having an abnormal condition such as malignancy or pre-malignancy. The processor 321 may evaluate OOIs for their nuclear integrated or average optical density, and rank the OOIs according to optical density values. The OOI/FOI information may be stored for subsequent processing, review or analysis using the review station 330. One known review microscope 336 automatically proceeds to the 22 FOI locations such that the cytologist may review the OOIs in each FOI. In one automated system, the review station 330 includes a mouse-like joystick that is used to navigate the slide 200. For example, one system includes "NEXT" and "PREVIOUS" buttons that are used to navigate the next and previous FOI. During review, the cytologist can electronically mark OOIs having attributes consistent with malignant or pre-malignant cells for further review by a pathologist by pressing a "MARK" button to identify a particular OOI, e.g., by (x,y) coordinates. An "OBJECTIVE" button may be used to change the objective magnification.

In certain other systems, a motorized stage is retrofitted onto a known microscope, e.g., as shown in FIGS. 1A-B, and coaxial control knobs, which are the same as or similar to control knobs 121, 122 shown in FIGS. 1A-B, may be used to position the stage 110. In certain known systems, automated review functions are controlled using a desktop mouse/graphical user interface and a footswitch that is manipulated by a cytologist to advance through different fields of view or fields of interest.

FIG. 4 illustrates another control mechanism 400 for an automated microscope that includes a base 410, a vertical support 420 extending from the base 410, a lateral support 430, and multiple rotary knobs 441*a-c* attached to one or more supports 420, 430. Two rotary knobs 441*a*, 441*b* are used to control movement of the stage in the "x" and "y" directions, and a third rotary knob 441*c* is used to control the focus by controlling movement of the stage in the "z" direction. Control of other microscope parameters and settings (such as brightness) is accomplished using one or more push buttons 444*a-d* on the base 410.

While known automated screening systems and components for controlling microscopes have generally been used effectively, they can be improved. A typical review microscope is configured such that a cytologist's body is positioned in a certain manner to have a certain posture for a comfortable seating position while reviewing specimens through the ocular lenses. In this position, it is often the case that the cytologist's arms are extended to provide support and proper posture, which is particularly important during extended review sessions.

Known control mechanisms, however, typically require a cytologist to utilize different control components that are located at different locations. With such system configurations, a cytologist may either fumble around to locate the controls while looking through the ocular lens to review the specimen, or may be required to look away from the ocular lens and the specimen to locate the controls, manipulate the controls to make the required adjustments, then return his or her eyes to the ocular lens to continue reviewing the specimen. For example, in one known system that includes separate stage control and joystick/review control devices, a cytologist have to look away from the specimen, locate separate stage control and joystick-like devices, manipulate the joystick, then return to the ocular lens to continue specimen review.

Further, certain cytologists may not be comfortable with review system controls that are provided by an automated system. In these cases, if a cytologist observes cells that look suspicious and require further review, he or she may remove a slide from the review scope, place the slide on an independent manual microscope, e.g., as shown in FIGS. 1A-B, and review the specimen using the independent microscope that includes coaxial (x,y) stage and focus controls as shown in FIG. 1. A cytologist may avoid using an unfamiliar review controls with this technique, but it is not convenient, requires additional equipment, requires the cytologist to look away from the automated review scope and move to another microscope, and increases the time required to complete specimen review.

SUMMARY

According to one embodiment, a single-handed apparatus for controlling a microscope includes two rotary controllers. The first rotary controller is configured for manipulation by a single hand of an operator to adjust a position of a microscope stage. The second rotary controller is configured and arranged relative to the first rotary controller for manipulation by an extended finger of the single hand to review previously identified portions of a biological specimen while the hand remains in contact with the first rotary controller.

According to another embodiment, a single-handed apparatus for controlling a microscope includes two rotary controllers attached to the microscope and positioned adjacent to a microscope stage. The first rotary controller includes two rotary control elements. The first rotary control element is configured for manipulation by a thumb of a single hand of an operator to move the microscope stage in a first direction. The second rotary control element is coaxial with the first rotary control element and configured for manipulation by a first finger of the single hand to move the microscope stage in a second, different direction. The second rotary controller is controller is configured and arranged relative to the first rotary controller for manipulation by an extended second finger of the single hand to controllably review previously identified portions of a biological specimen while the single hand remains in contact with the first rotary controller.

A single-handed apparatus for controlling a microscope constructed according to another embodiment includes a first controller configured for manipulation by a single hand of an operator to adjust a position of a microscope stage and a second controller configured for manipulation by an extended finger of the single hand to controllably review previously identified portions of a biological specimen while the hand remains in contact with the first controller.

A further alternative embodiment is directed to a method of controlling a microscope using one hand. The method includes adjusting a position of a microscope stage by rotating a first controller using a single hand, and reviewing previously identified portions of a biological specimen by rotating a second controller using an extended finger of the single hand while the hand remains in contact with the first controller.

A further embodiment is directed to a method of controlling a microscope using one hand that includes moving a microscope stage in a first direction by rotating a first rotary control element of a first controller using a thumb of a single hand and moving the microscope stage in a second direction different than the first direction by rotating a second rotary control element of the first controller using a first finger of the single hand. The method further includes controllably reviewing previously identified portions of a biological specimen by rotating a second controller using an extended second finger of the single hand while the hand remains in contact with the first controller.

Another embodiment is directed to a method of controlling a microscope using one hand that includes adjusting a position of a microscope stage by manipulating a first controller using a single hand and reviewing previously identified portions of a biological specimen using an extended finger of the single hand while the hand remains in contact with the first controller.

According to a further alternative embodiment, an automated specimen review system includes a microscope, a processing device operably coupled to the microscope and associated with a display and configured to present a plurality of icons to a user on the display, and a single-handed controller apparatus. The single-handed controller apparatus includes two rotary controllers. The first rotary controller is configured for manipulation by a single hand of an operator to adjust a position of a stage of the microscope, and the second rotary controller is configured and arranged relative to the first rotary controller for manipulation by an extended finger of the single hand to select an icon presented on the display of the processing device.

An additional embodiment is directed to a method of controlling a microscope using one hand by positioning a first hand on a first controller, adjusting a position of a microscope stage by rotating the first controller using the first hand, positioning the first hand on a second controller and reviewing previously identified portions of a biological specimen by rotating the second controller using the first hand.

In one or more embodiments, first and second rotary controllers extend substantially vertically from the microscope and are rotatable about substantially parallel axes of rotation. The first rotary controller may be a coaxial component that includes two rotary control elements. The first rotary control element is configured for moving the microscope stage in a first direction, e.g., by manipulation of the first rotary control element by a thumb of the operator's hand. The second rotary control element, which is coaxial with the first rotary control element, may be configured for moving the microscope stage in a second direction different than the first direction, e.g., by manipulation of the second rotary control element by at least one finger of the hand.

In one or more embodiments, the second rotary controller is configured and arranged relative to the first rotary controller for manipulation by an extended index finger of the single hand, and the first rotary controller may be configured for manipulation by an index finger of the operator's hand while the index finger is not extended. Further, in one or more embodiments, the second rotary controller may be configured for manipulation by an extended finger different from the at least one finger that is used for manipulation of the first rotary controller.

In one or more embodiments, the second rotary controller that is configured and arranged for manipulation by an extended finger is a scroll wheel or a rotary encoder. With this configuration, a position of the scroll wheel determines which previously identified portion of the specimen is presented to the operator. An operator may rotate the scroll wheel to scroll through different portions or fields of interest. Further, in one or more embodiments, a single-handed control apparatus may include a switch associated with the second rotary controller, such a scroll wheel. The switch is configured for actuation as a result of application of force and displacement of the second rotary controller by the operator's extended finger to electronically mark a previously identified portion of the biological specimen. For example, the second rotary controller and the switch may be configured such that the switch is actuated by lateral or vertical displacement of the second rotary controller.

BRIEF DESCRIPTION OF THE DRAWINGS

Referring now to the drawings in which like reference numbers represent corresponding parts throughout and in which:

FIG. 12 illustrates how a user can electronically mark a portion of a specimen, according to yet another embodiment of the present inventions;

DETAILED DESCRIPTION OF ILLUSTRATED EMBODIMENTS

Figure 1A:
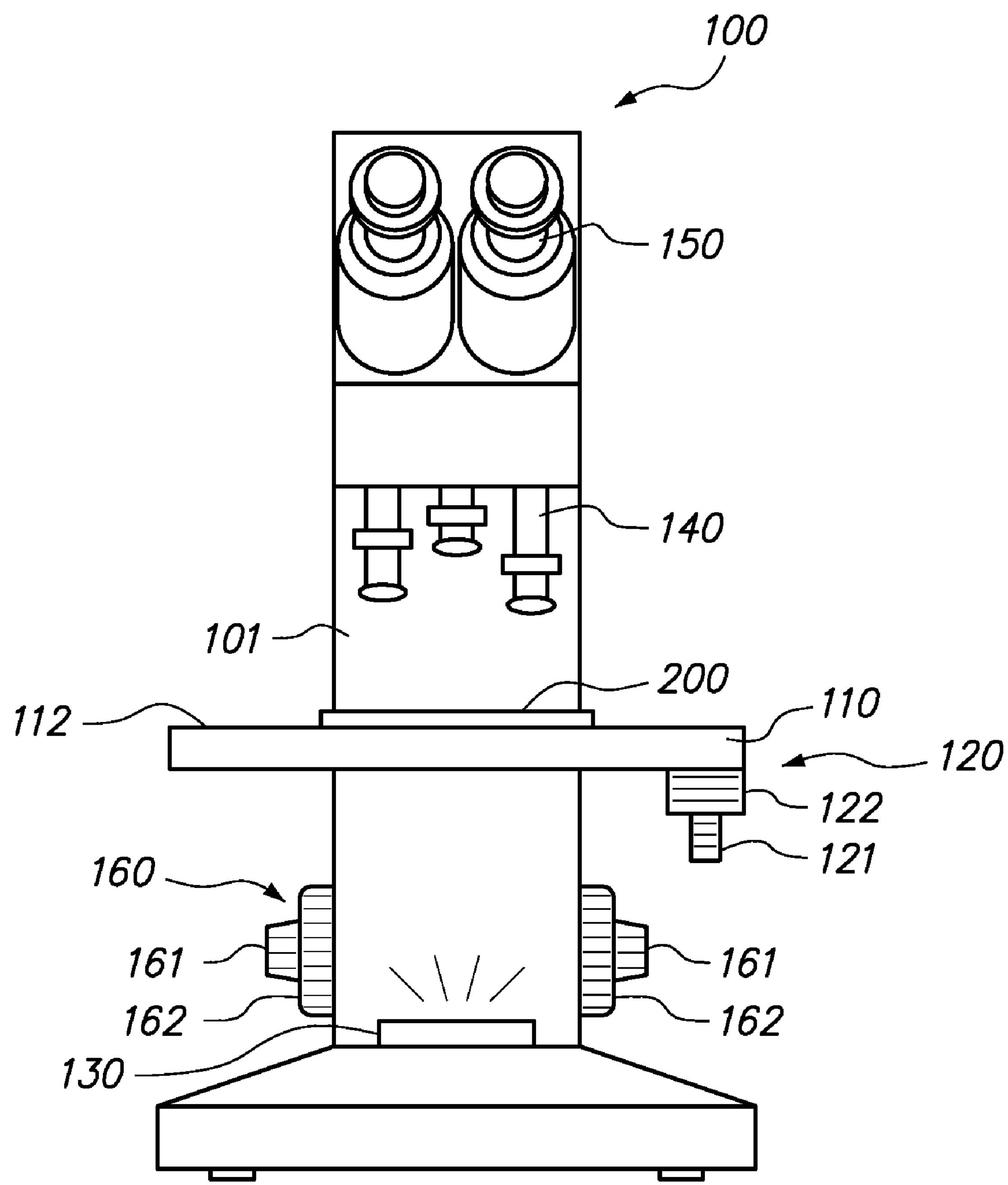
FIG. 1A is a front view of a known microscope.
Figure 1B:
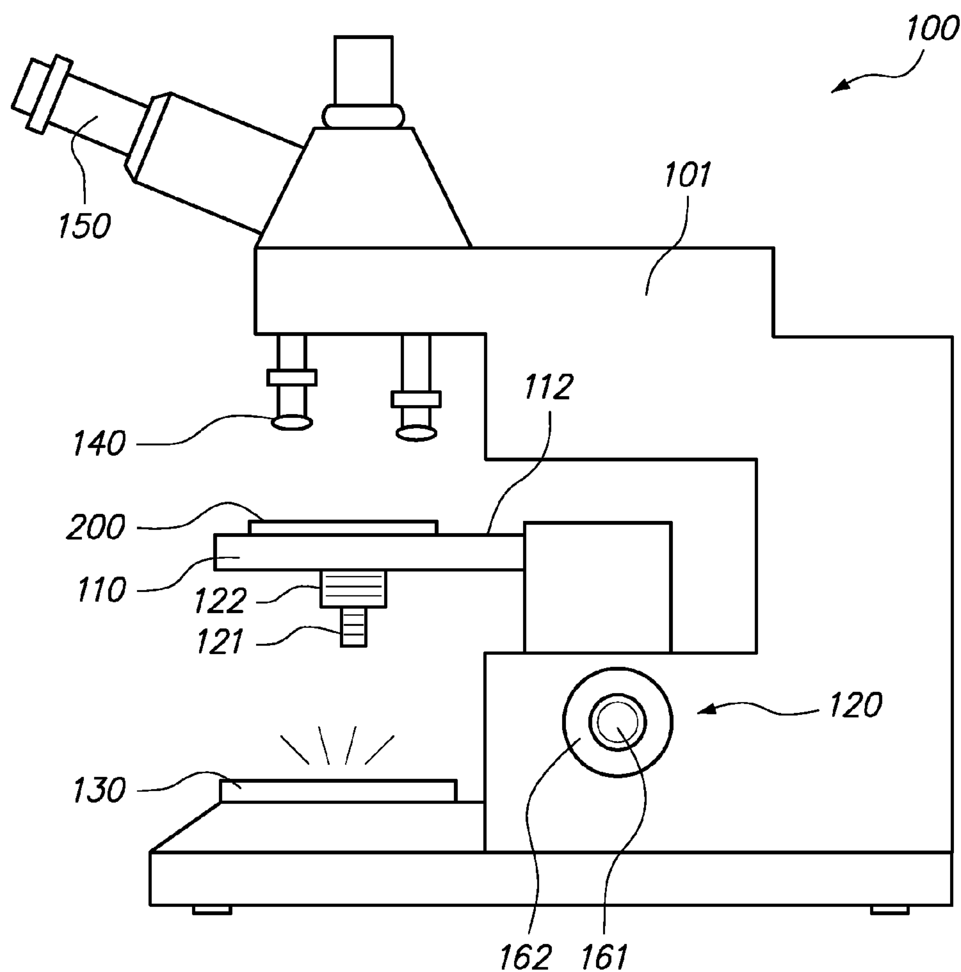
FIG. 1B is a side view of a known microscope.
Figure 2:
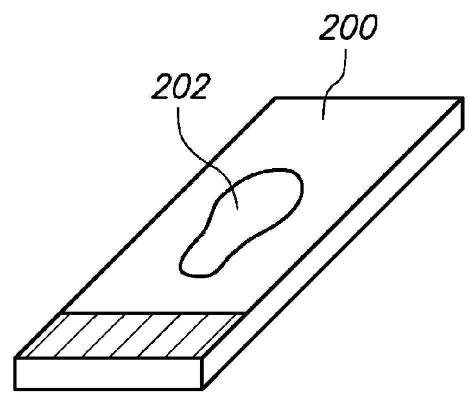
FIG. 2 is a perspective view of a known biological specimen slide.
Figure 3:
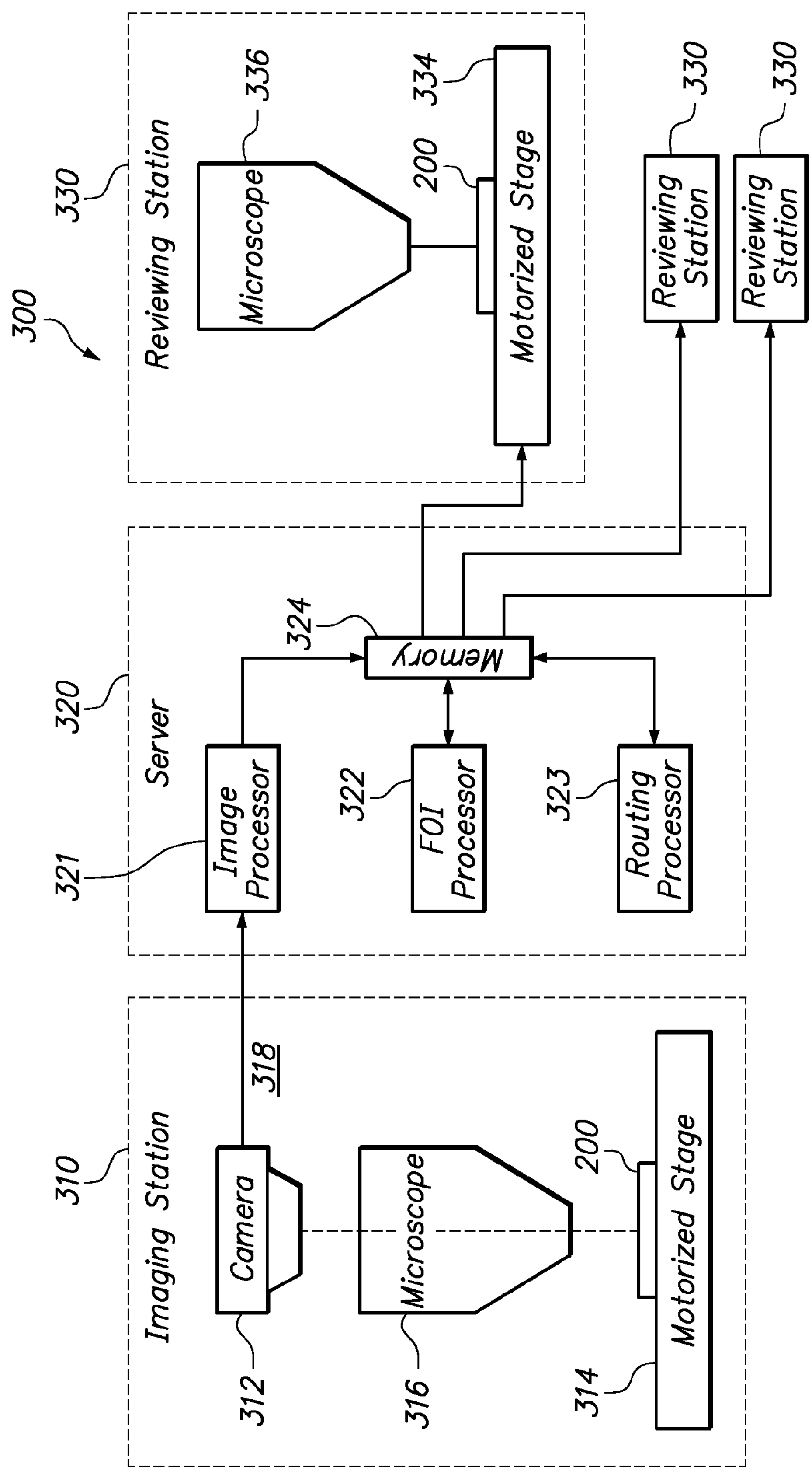
FIG. 3 schematically illustrates a known biological specimen imaging and review system.
Figure 4:
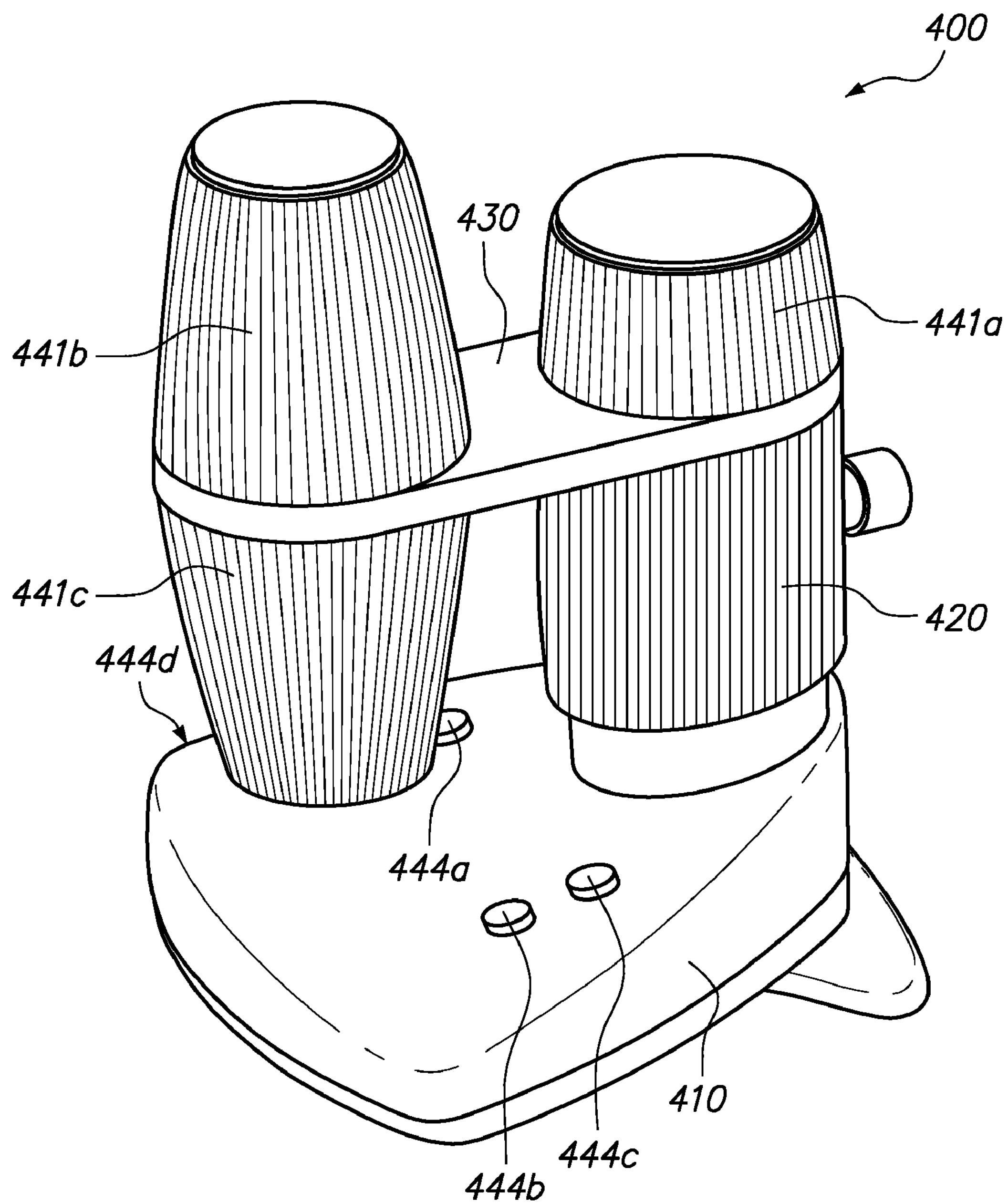
FIG. 4 shows a known microscope control mechanism.
Figure 5:
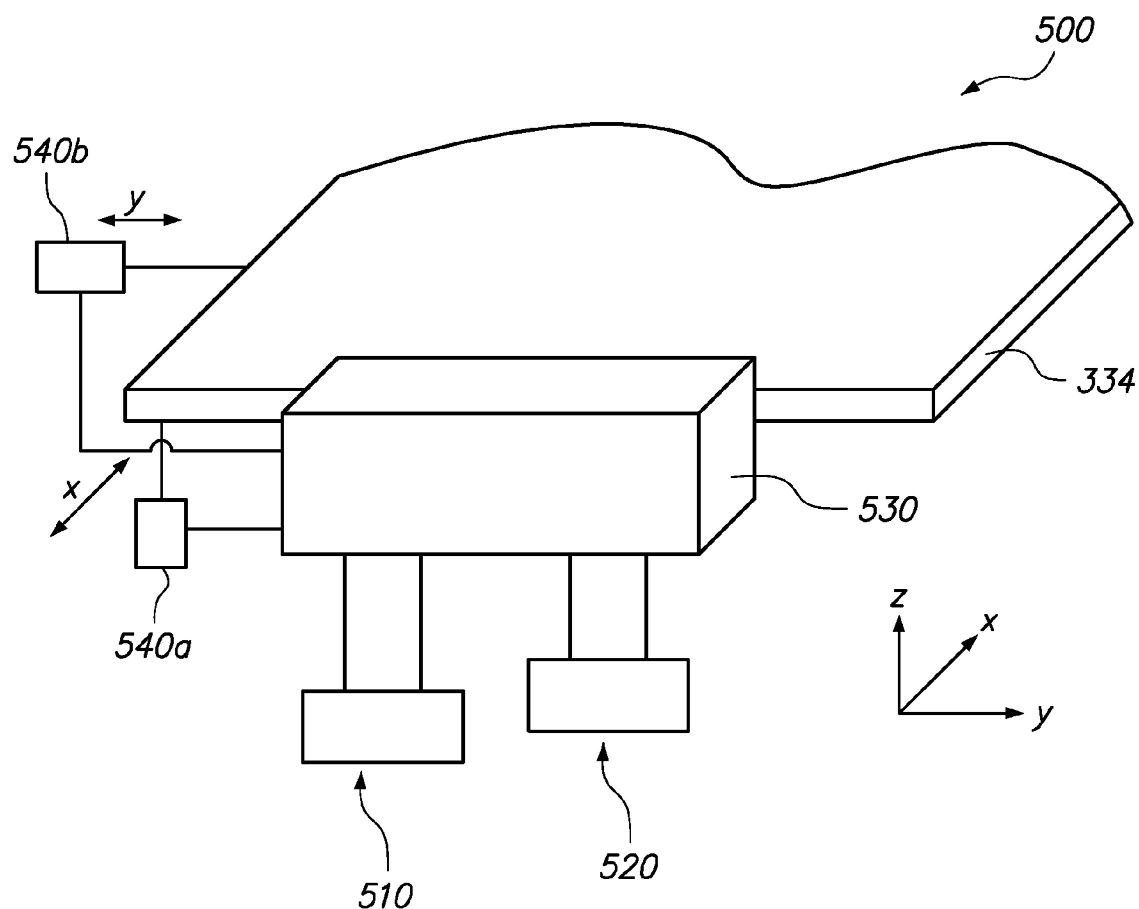
FIG. 5 illustrates a single-handed microscope control apparatus constructed, according to one embodiment of the present inventions.

Referring to FIG. 5, an apparatus 500 constructed according to one embodiment for controlling a microscope, such as an automated review microscope 336 shown in FIG. 3 or other similar review scope, includes a plurality of independent controllers 510, 520, such as a stage controller and a review controller, configured and arranged in proximity to each other such that they may be manipulated by the same hand of a cytologist or user (generally referred to as "user") to control different review scope 336 functions. It should be understood that control apparatus 500 embodiments may be utilized with various automated review scopes, including the automated review scope 336 generally illustrated in FIG. 3 and other automated review scopes. For ease of explanation, reference is made to the review scope 336, and components that are the same as or similar to microscope 100 components shown in FIGS. 1A-B, to describe apparatus embodiments may be utilized to single-handedly control multiple, different functions of the review scope 336.

In the embodiment illustrated in FIG. 5, both of the controllers 510, 520 are attached to the microscope stage 110 through a control interface 530. Each controller 510 may have its own associated control interface, but reference is made to a single control interface 530 for ease of explanation and illustration. The first controller 510 may be operably coupled to motors 540*a-b* or other controllers through the control interface 530 to move the stage 334. The second controller 520 may be operably coupled to the review scope 336 (e.g., a processor, memory or other component) through the control interface 530 to control review functions of the review scope 336 while a user reviews a specimen 202. The control interface 530 may include one or more motors, processors, switches, and/or other suitable components and circuitry (not shown for ease of illustration) to implement these functions. Certain control components may be located within or outside of the control interface 530. For example, as shown in FIG. 5, motors 540*a-b* for moving the stage 336 are shown as separate, external components, but they may also be included within the control interface 530.

Figure 6:
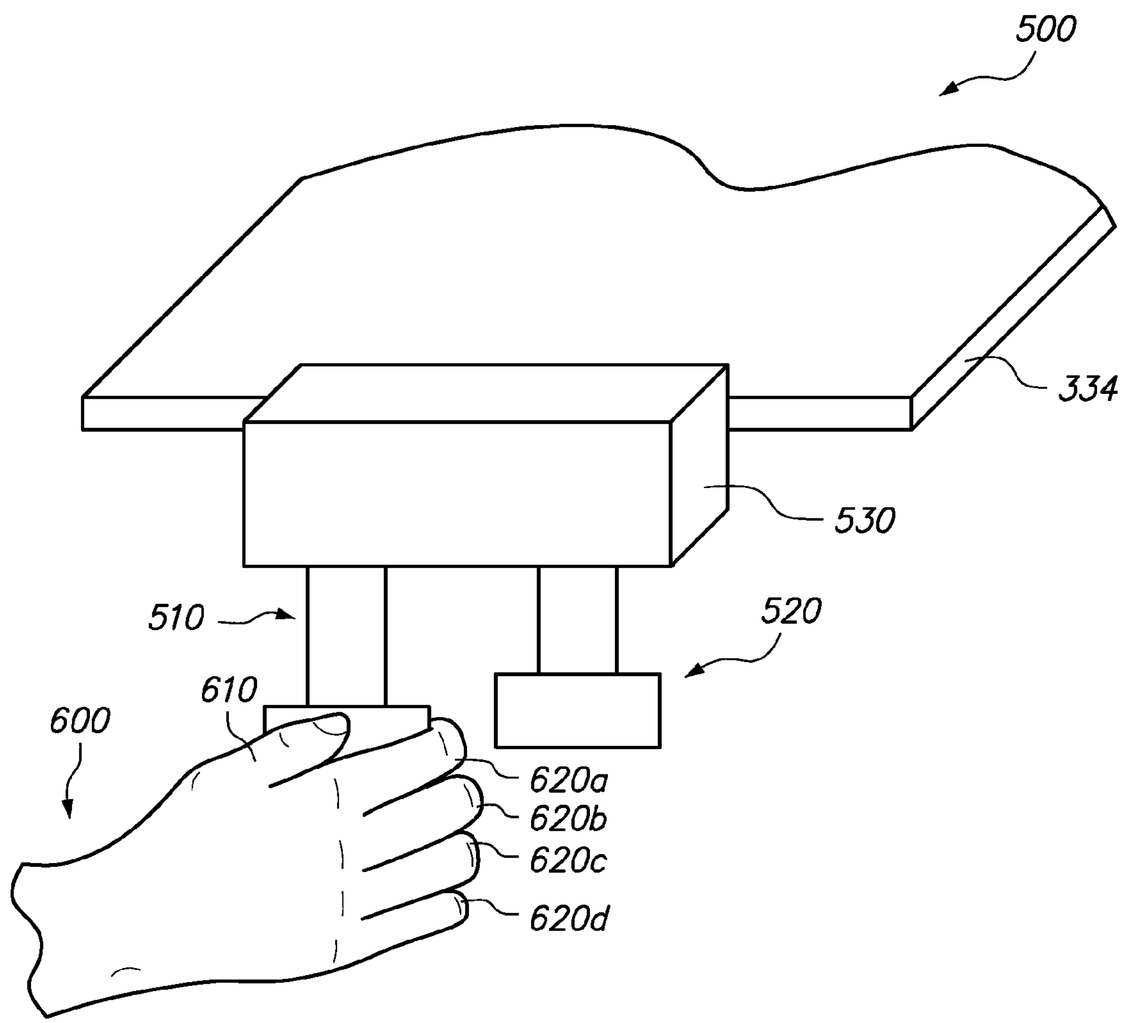
FIG. 6 illustrates how a microscope stage can be moved using the embodiment of FIG. 5.
Figure 7:
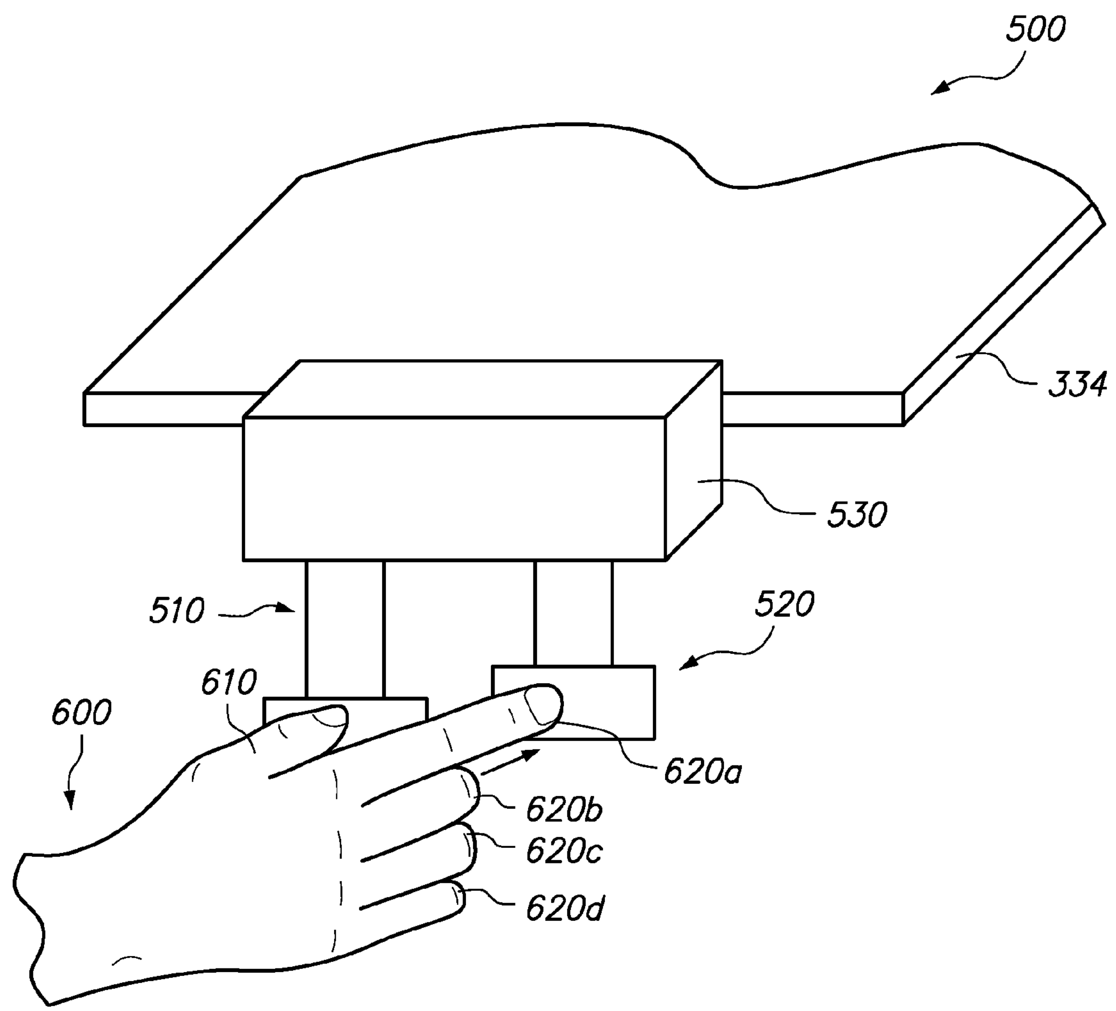
FIG. 7 illustrates how review functions of a review scope can be controlled by extending a finger to manipulate a control element of the embodiment of FIG. 5.

With further reference to FIGS. 6 and 7, the control apparatus 500 is configured such that the independent controllers 510, 520 are separated from and independent of each other, but sufficiently close to each other, such that one hand 600 of the user may manipulate the first controller 510 to move the stage 334, and also manipulate the second controller 520 to control review functions of the review scope 336. For this purpose, as shown in FIG. 6, the two controllers 510, 520 are configured and positioned such that the first controller 510 may be manipulated by a closed or partially closed hand 600, e.g., using a thumb 610 and/or one or more retracted or bent fingers 620*a-d*. The second controller 520 is configured and positioned relative to the first controller 510 such that the user may extend his or her index finger 620*a* to manipulate the second controller 520. This may be done while the user's hand 600 remains on or in contact with the first controller 510, which may serve as a "home" or "rest" position for the user's hand 600.

In another embodiment, the first and second controllers 510, 520 are arranged such that a different finger, such as finger 620*b*, is extended to manipulate the second controller 520. In a further alternative embodiment, multiple fingers, such as fingers 620*a-b*, may be extended to manipulate the second controller 520. For ease of explanation, reference is made to extension of an index finger 620*a* to manipulate the second controller 520.

As shown in FIGS. 6 and 7, the user may advantageously control different functions of the review scope 336 and different controllers 510, 520 using one hand 600 and selective extension of the index finger 620*a* of the hand 600. This advantageously allows a user to quickly and easily switch back and forth between stage controls and review controls with a single hand 600, e.g., with a single finger 620*a*. These advantages are achieved while allowing the user to continue looking through ocular lenses 150 to focus on the specimen 202. In one embodiment, as shown in FIGS. 7 and 8, the general position of the user's hand 600 may remain unchanged while utilizing different controllers 510, 520, except when the index finger 620*a* is extended to manipulate the second controller 520 and bent or retracted when it is not necessary to manipulate the second controller 520.

Figure 8:
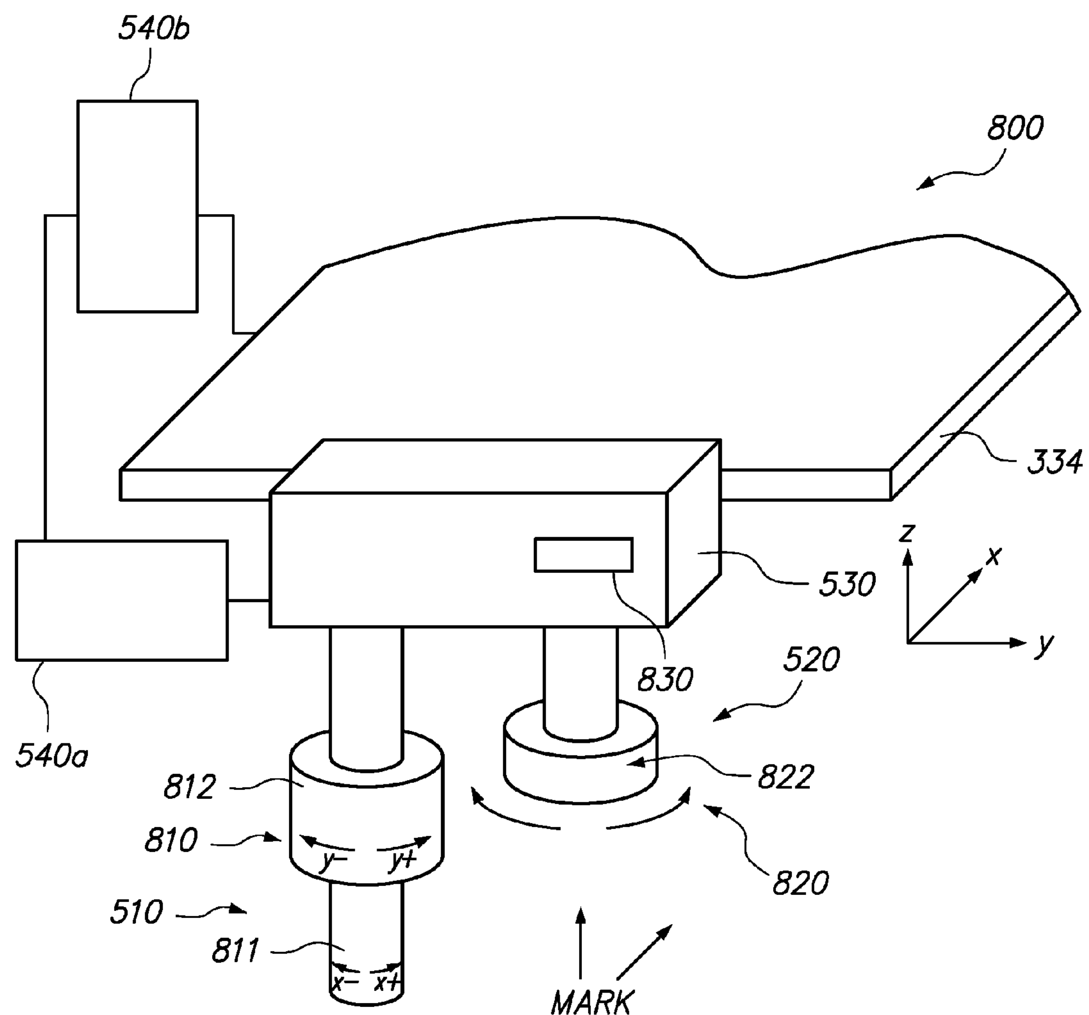
FIG. 8 illustrates a single-handed microscope control apparatus constructed, according to another embodiment of the present inventions.

Referring to FIG. 8, a single-handed microscope control apparatus 800 constructed according to one embodiment and as generally illustrated in FIG. 5 includes first and second controllers 510, 520 in the form of rotary controllers 810, 820. In one embodiment, the (x,y) position of the stage 334 may be controlled by rotating rotary controller 810, and review functions of the review scope 336 may be controlled by rotating rotary controller 820.

In the illustrated embodiment, the first rotary controller 810 is a coaxial rotary controller that includes first and second rotary control elements 811, 812. The first rotary control element 811 may be rotated to move the microscope stage 334 in a first direction (e.g., the "x" direction), and the second rotary control element 812, which is coaxial with the first rotary control element 811, may be rotated to move the microscope stage 334 in a different direction (e.g., the "y" direction). In the illustrated embodiment, the second rotary controller 820 includes a single rotatable element 822 which, in one embodiment, is a scroll wheel. In the illustrated embodiment, the first and second rotary controllers 810, 820 extend substantially vertically from the control interface 830 and are substantially parallel to each other. Embodiments, however, may be configured in other manners to adapt to particular system configurations, hand sizes and positioning.

Figure 9:
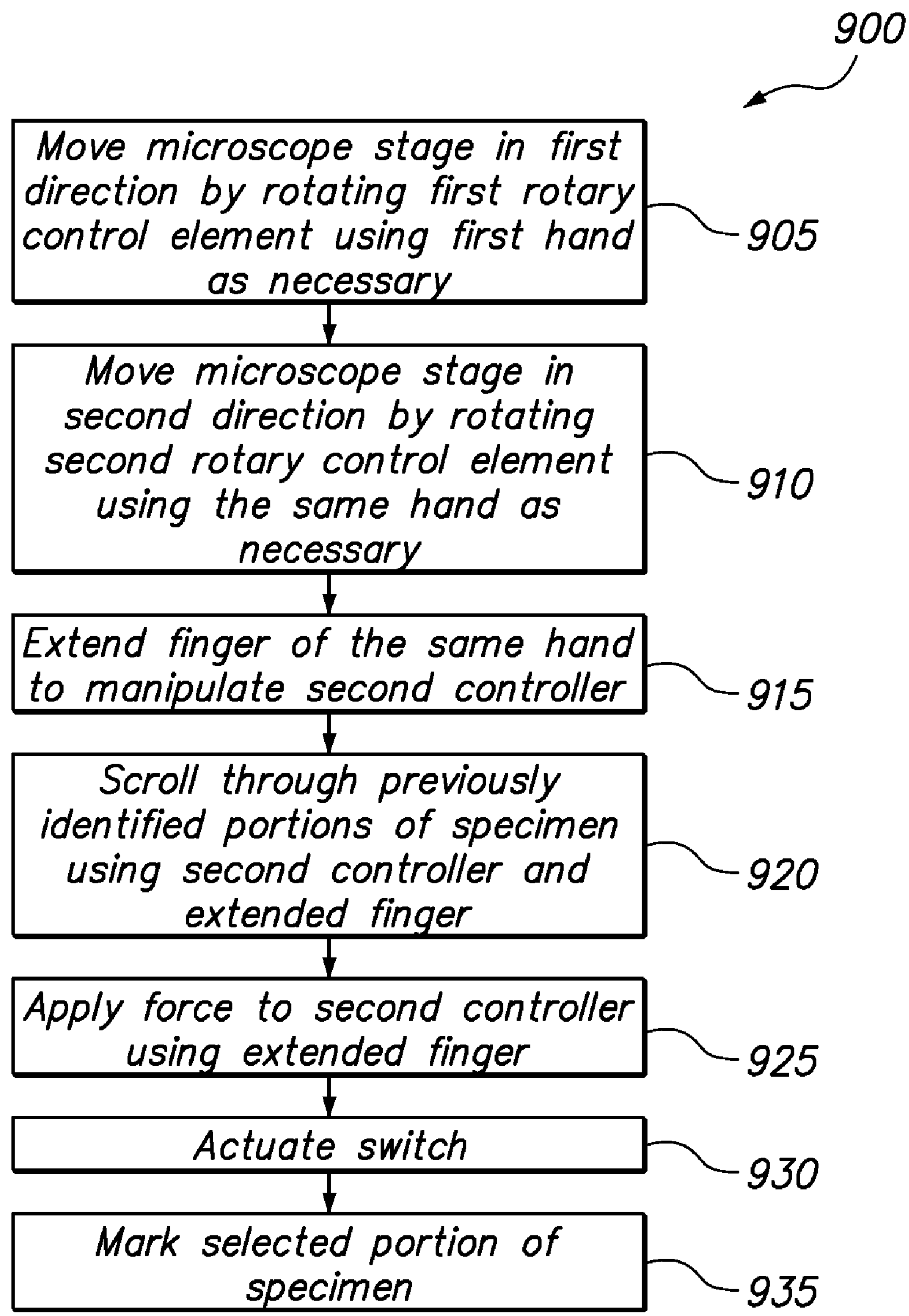
FIG. 9 is a flow chart showing a method of controlling a microscope, according to still another embodiment of the present inventions.
Figure 10:
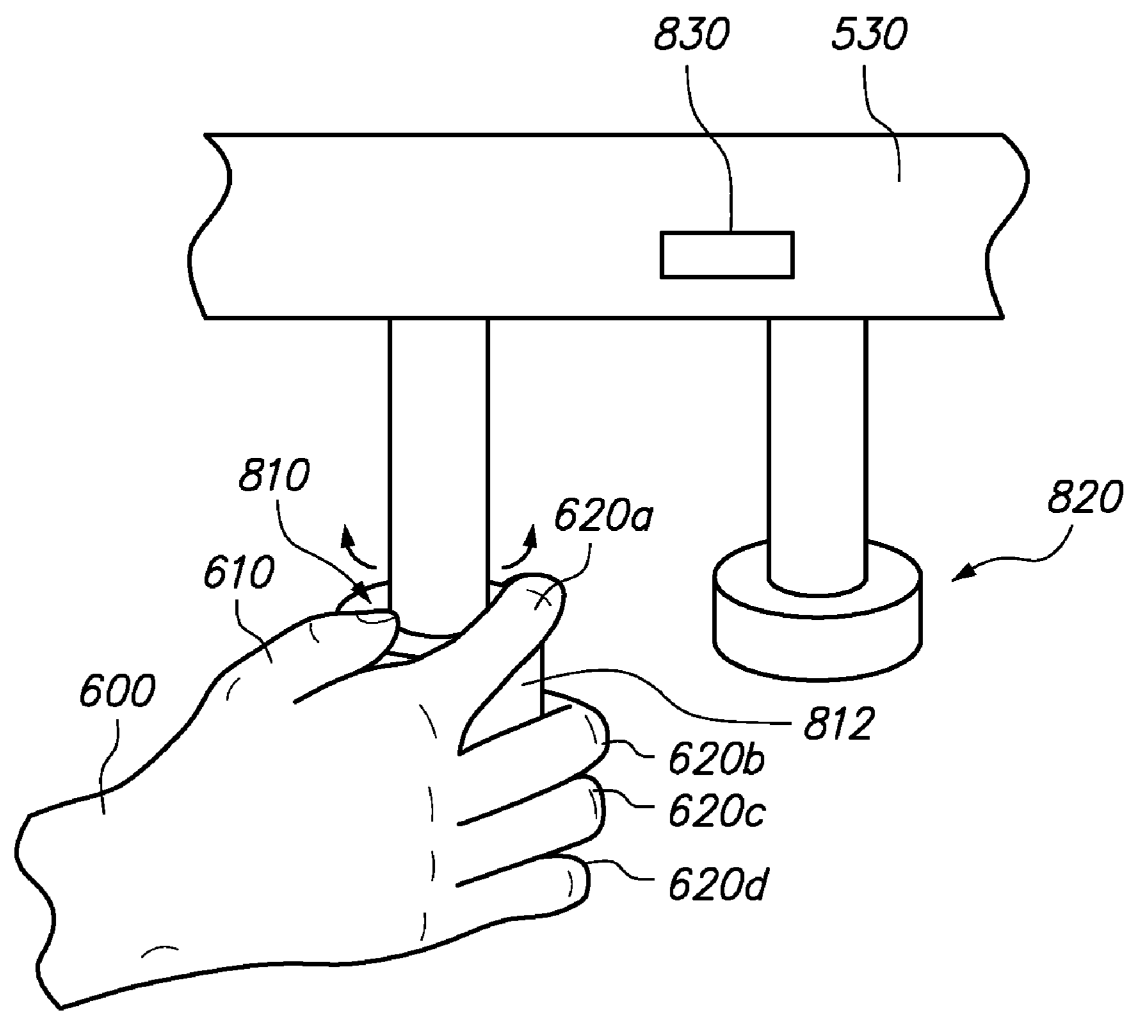
FIG. 10 illustrates how a microscope stage can be moved using the embodiment of FIG. 8.

With further reference to FIGS. 9 and 10, a method 900 of controlling an automated review scope 336 according to one embodiment using, for example, the control apparatus 800 illustrated in FIG. 8, includes moving the microscope stage 334 in a first direction (e.g., "x" direction) by rotating the first rotary control element 811 of the first controller 810 using one hand during step 905 (as necessary), and moving the microscope stage 334 in a second, different direction (e.g., "y" direction) by rotating the second rotary control element 812 of the first controller 810 using the same hand during step 910 (as necessary). As shown in FIG. 10, steps 905 and 910 may be performed to place the stage 334 in a desired position using a closed or partially closed hand 600, e.g., using the thumb 610 and/or a bent or retracted index finger 620*a*.

Figure 11:
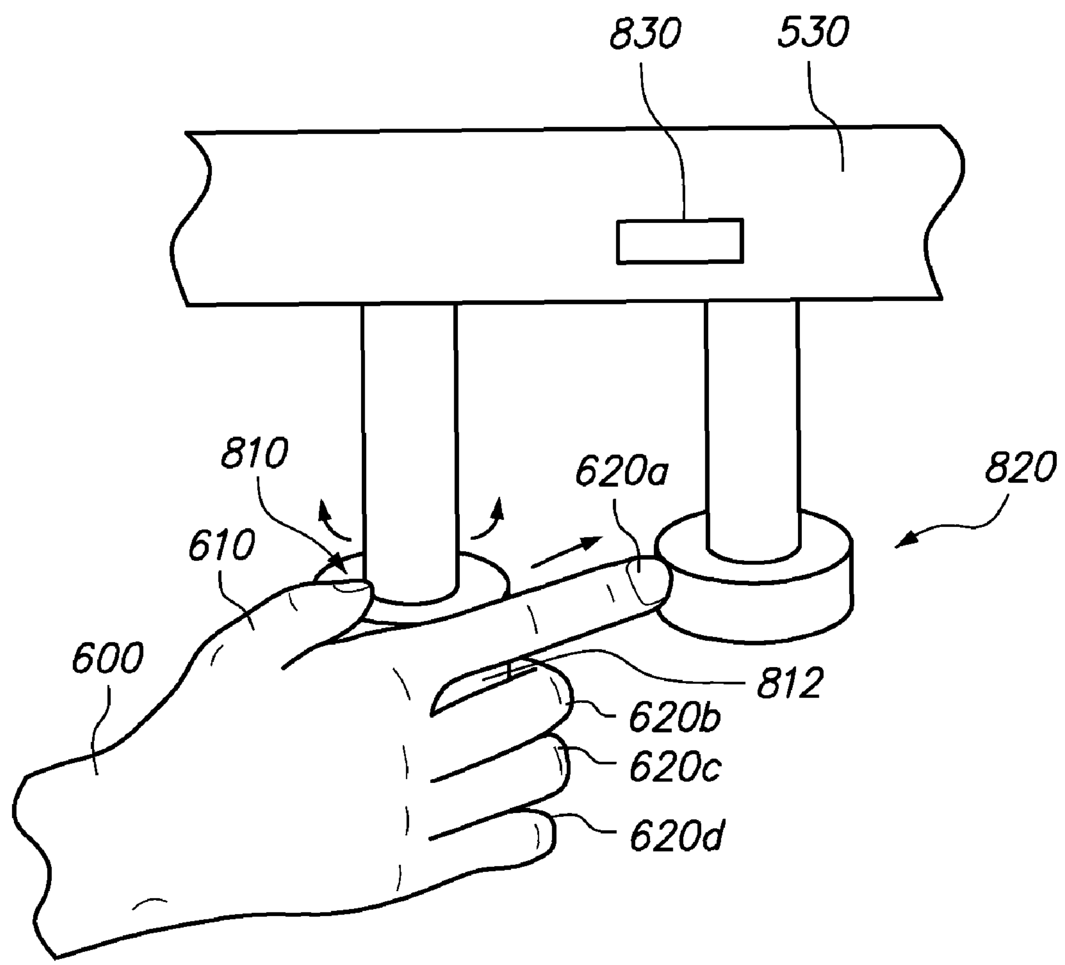
FIG. 11 illustrates how review functions of a review scope can be controlled by extending a finger to manipulate a control element of the embodiment of FIG. 8.

Referring again to FIG. 9, and with further reference to FIG. 11, according to one embodiment, the index finger 620*a* of the user's hand 600 is extended (e.g., substantially or fully extended) to engage and manipulate the second rotary controller 820 during step 915. During and/or after step 915, the user's hand 600 may remain on or in contact with the first controller 810, e.g., as a rest or home position.

During step 920, the user rotates the second rotary controller 920 to control review functions of the review scope 336. In one embodiment, the second rotary controller 920 is rotated to sequentially scroll through previously identified FOIs, the coordinates of which were previously identified by the processor 321. During this review, the user may identify one or more OOIs that should be analyzed in further detail by a pathologist. In this case, during step 925, and with further reference to FIG. 12, the user may apply a force to the second controller 820, thereby actuating an associated switch 830 at stage 930, and the output of the switch 830 is provided to a suitable controller or other system component to electronically mark the OOI of interest at stage 935 for further review by the pathologist. One suitable switch 830 that may be used for this purpose is a micromechanical switch.

As shown in FIG. 12, one manner in which an OOI or other portion of a specimen 202 may be electronically marked is by pushing the second rotary controller 820 with an extended index finger 620*a* to actuate an associated switch 830. In this embodiment, review functions are controlled in part by rotary and non-rotary motion, i.e., by rotating the second rotary controller 820 to present or scroll through different FOIs, and by a lateral force and resulting slight movement that actuates the switch 830 to mark an OOI for further review.

Figure 13:
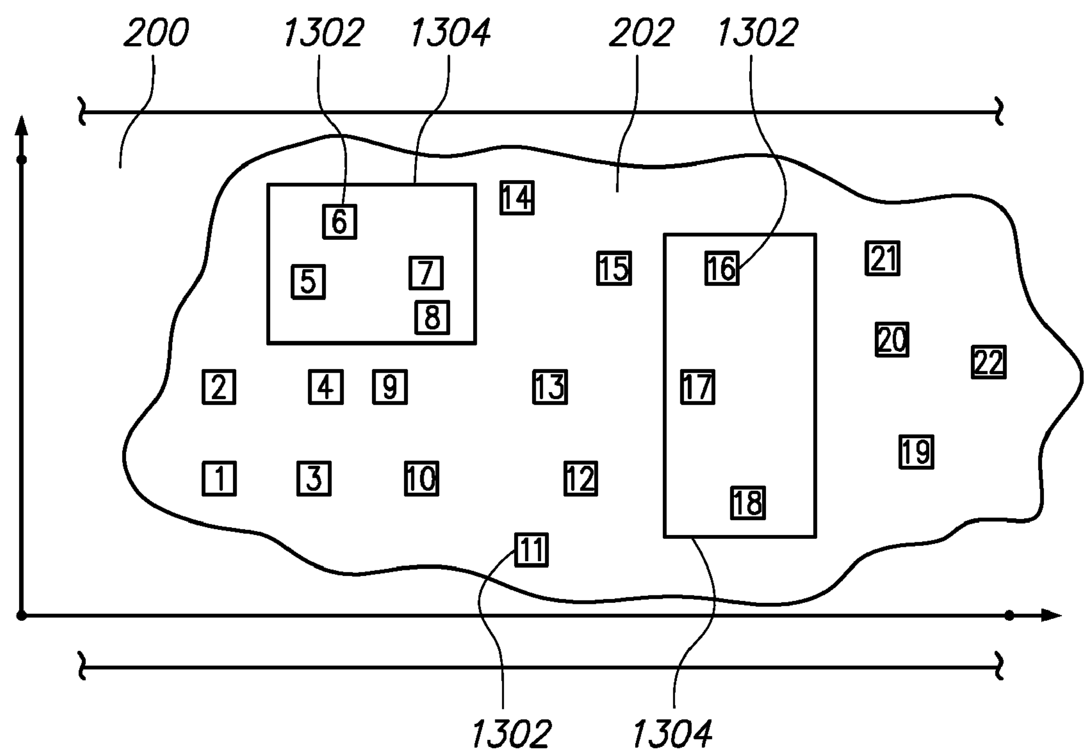
FIG. 13 illustrates examples of objects of interest of a biological specimen.
Figure 14:
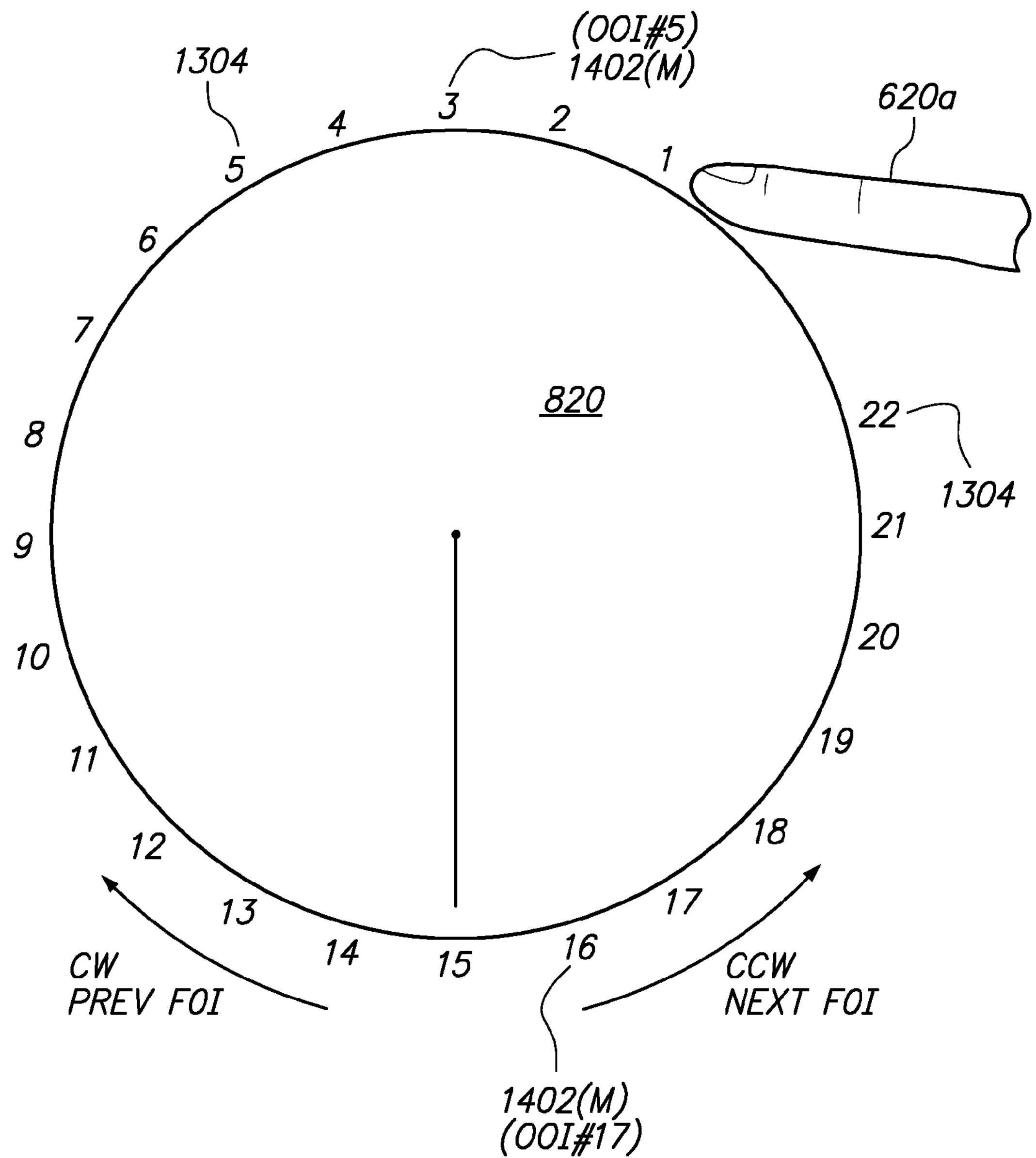
FIG. 14 illustrates how embodiments of the present inventions may be used to scroll through fields of interest to view objects of interest shown in FIG. 13.
Figure 15:
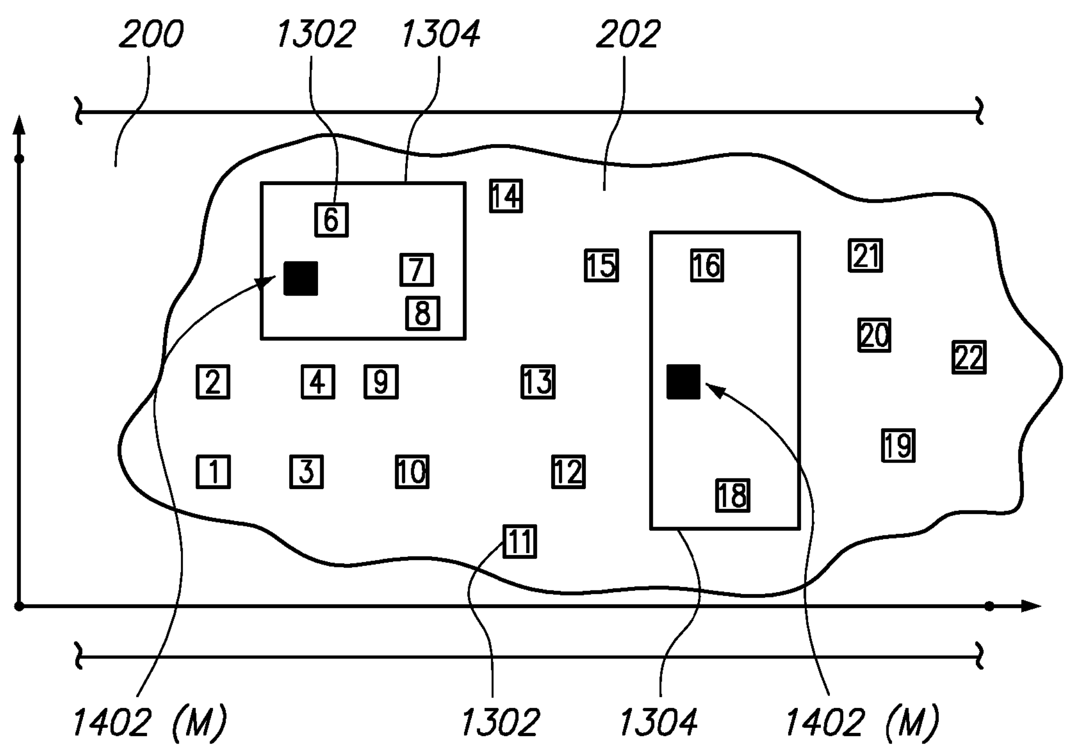
FIG. 15 illustrates how embodiments of the present inventions may be used to mark portions of a biological specimen shown in FIG. 13.

It should be understood that although FIG. 12 shows visible movement of the second rotary controller 820, but in practice, the actual displacement of the second rotary controller 820 may be significantly less. FIG. 12 is provided to generally illustrate that a force, such as a lateral force, on the second rotary controller 820 applied by the index finger 620*a* may actuate the switch 830 for purposes of marking an OOI. In an alternative embodiment, the second rotary controller 820 and the switch 830 may be configured such that electronic marking of selected OOIs may be achieved by applying a vertical force (e.g., an upward or a downward force) to the second rotary controller 820 to activate the switch 830 and mark the OOI. FIGS. 13-15 illustrate in further detail one embodiment controlling review functions to mark OOIs.

FIG. 13 illustrates a biological specimen 202 affixed to a slide 200 and portions of the specimen 202, or OOIs 1302, that were identified by the processor 321 based on the associated image data 318 of the specimen 202. Selected OOIs 1302 may be organized into one or more FOIs 1304. The server 321 may be configured to identify OOIs 1302 based on, for example, the degree to which certain cells or OOIs 1302 are at risk of having an abnormal condition such as malignancy or pre-malignancy, which are then organized into FOIs, e.g., 22 FOIs 1304. FIG. 13 illustrates two FOIs 1304, but in practice there may be 22 FOIs 1304, or other numbers of FOIs 1304 as needed. Each FOI 1304 may include one or more OOIs 1302. In the illustrated example, one FOI 1304 includes OOI 1302 numbers 5-8, and another FOI 1304 includes OOI 1302 numbers 16-18.

FOI 1304 coordinates are provided from the server 320 to the review microscope 336, which proceeds to the identified FOI 1304 coordinates based on the rotational position of the second rotary controller 820 rather than based on a joystick device as in certain known automated review systems. More particularly, referring to FIG. 14, the user may scroll through the 22 FOIs 1304 by rotating the second rotary controller 820 in clockwise (CW) and counter clockwise (CCW) directions. In the illustrated example in which the second rotary controller 820 is currently positioned for review of FOI 1304 number 15, rotating the second rotary controller 820 in a clockwise direction steps the user back through previous (PREV) FOIs 1304, i.e., FOI 1304 numbers 14, 13, 12, and so on, whereas rotating the second rotary controller 820 in a counter clockwise direction steps the user through the next (NEXT) FOIs 1304, i.e., FOI 1304 numbers 16, 17, 18 and so on. In another embodiment, the second rotary controller 820 is configured such that rotating the second rotary controller 820 in a counter clockwise direction steps the user back through previous (PREV) FOIs 1304, whereas rotating the second rotary controller 820 in a clockwise direction steps the user through the next (NEXT) FOIs 1304.

Referring to FIGS. 14 and 15, during review of the 22 FOIs 1304, the user may identify certain OOIs 1302 within one or more FOIs that should be analyzed more closely. In the illustrated example, FOI 1304 numbers 3 and 16 contain such OOIs 1302. Of course, in practice, various numbers of OOIs 1302 may be identified in other FOIs 1304. In this particular example, when the second rotary controller 820 is rotatably positioned to view FOI 1304 number 3 (i.e., rotated 12 detents or "clicks" clockwise from the current position shown in FIG. 14), the user may electronically mark (M) 1402 an OOI 1302 in this FOI 1304 by extending his or her index finger 620*a* and actuating the switch 830, e.g., as described above with reference to FIG. 12. In the example shown in FIGS. 13 and 14, OOI 1302 number 5 within FOI 1304 number 3 is electronically marked 1402. Similarly, when the second rotary controller 820 is rotatably positioned to view FOI 1304 number 16 (i.e., rotated one detent or "click" counter clockwise from the example position shown in FIG. 14), the user may electronically mark (M) 1402 OOI 1302 number 17 within FOI 1304 number 16 in a similar manner.

According to one embodiment, the second rotary controller 820 is a scroll wheel or rotary encoder, such as a mechanical or optical rotary encoder, that includes quadrature output for direction that presents one of the 22 FOIs 1304 based on the rotational position of the second rotary controller 820 as shown in FIG. 14. Scrolling through the various FOIs 1304 may involve rotating the second rotary controller 820 less than 360 degrees (e.g., as shown in FIG. 14), about 360 degrees, or more than 360 degrees. The degree of second rotary controller 820 rotation per FOI 1304 that is displayed may depend on, for example, the number of FOIs 1304, the diameter of the second rotary controller 820 and other system configurations.

The distance between the first and second controllers 810, 820 is sufficiently large such that the scroll wheel controller 820 does not interfere with the first rotary controller 810, but sufficiently small to enable an extended index finger 620*a* to manipulate the scroll wheel controller 820 and move between the controllers 810, 820. According to one embodiment, the second rotary controller 820 in the form of a scroll wheel having a diameter of about 1" and a height of about 0.25". The scroll wheel controller 820 may be separated from the first rotary controller 810 by about 1.5-2.0 inches. These component sizes and arrangements facilitate manipulation of both controllers 810, 820 while the user's hand 600 remains in contact with the first controller 810 and provide a comfortable finger rest for the user when the index finger 620*a* is substantially or fully extended. System component sizes and arrangements may be adjusted as necessary, e.g., to accommodate different hand sizes.

The scroll wheel controller 820 may be configured to include detents in both clockwise and counter clockwise directions to provide tactile feedback to the user to sense when the scroll wheel controller 820 has been rotated to the next or previous position to view the next or previous FOI 1304. In one embodiment, the scroll wheel controller 820 may be configured to include 16-32 detents per revolution. The amount of force that is required to roll or rotate the scroll wheel controller 820 may be about 50-200 grams per click or detent. Marking 1402 functions (e.g., applying lateral or vertical forces to actuate a switch 830) may be accomplished using a microswitch that may provide a snap-action for tactile feedback. For example, the amount of force required to be applied to a scroll wheel controller 820 to actuate the switch 830 may be about 50-200 grams based on a switch 830 actuator traveling or being displaced by about 1-3 mm. Of course, embodiments may be implemented with other scroll wheel controller 820 configurations, and that the arrangements, dimensions and forces described above are provided as examples of how embodiments may be implemented.

Although particular embodiments have been shown and described, it should be understood that the above discussion is not intended to limit the scope of these embodiments. Various changes and modifications may be made without departing from the scope of the claims.

Figure 16:
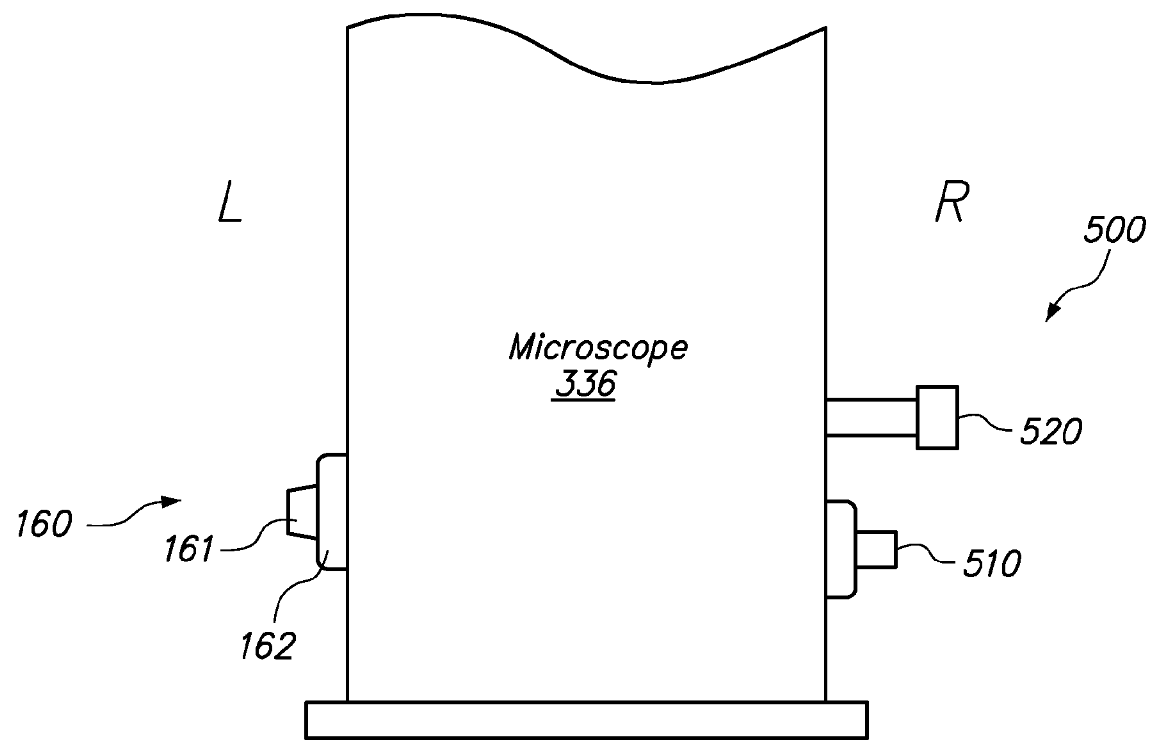
FIG. 16 illustrates a microscope system constructed according to one embodiment of the present inventions, in which focusing controls are manipulated with one hand and stage and review controls are manipulated with another hand.

For example, referring to FIG. 16, although embodiments are described with reference to an example of a review station 330 and review scope 336 shown in FIG. 3 without discussing microscope 336 focusing, embodiments may be integrated with microscopes and be arranged such that one hand of the user (e.g, the left hand (L)) is dedicated to manipulating a focus control 160 (e.g., a "z" position of the stage 334), and the other hand of the user (e.g., the right hand (R)) is dedicated to manipulating control apparatus embodiments (e.g., 500, 800) to move the stage 334 (in "x" and "y" directions) and to control review functions as described above. Thus, with embodiments, a cytologist can control three different functions (focus, lateral stage movement, review functions) with two hands, and without looking away from the ocular lenses 150 to maintain focus on the specimen 202.

Figure 17:
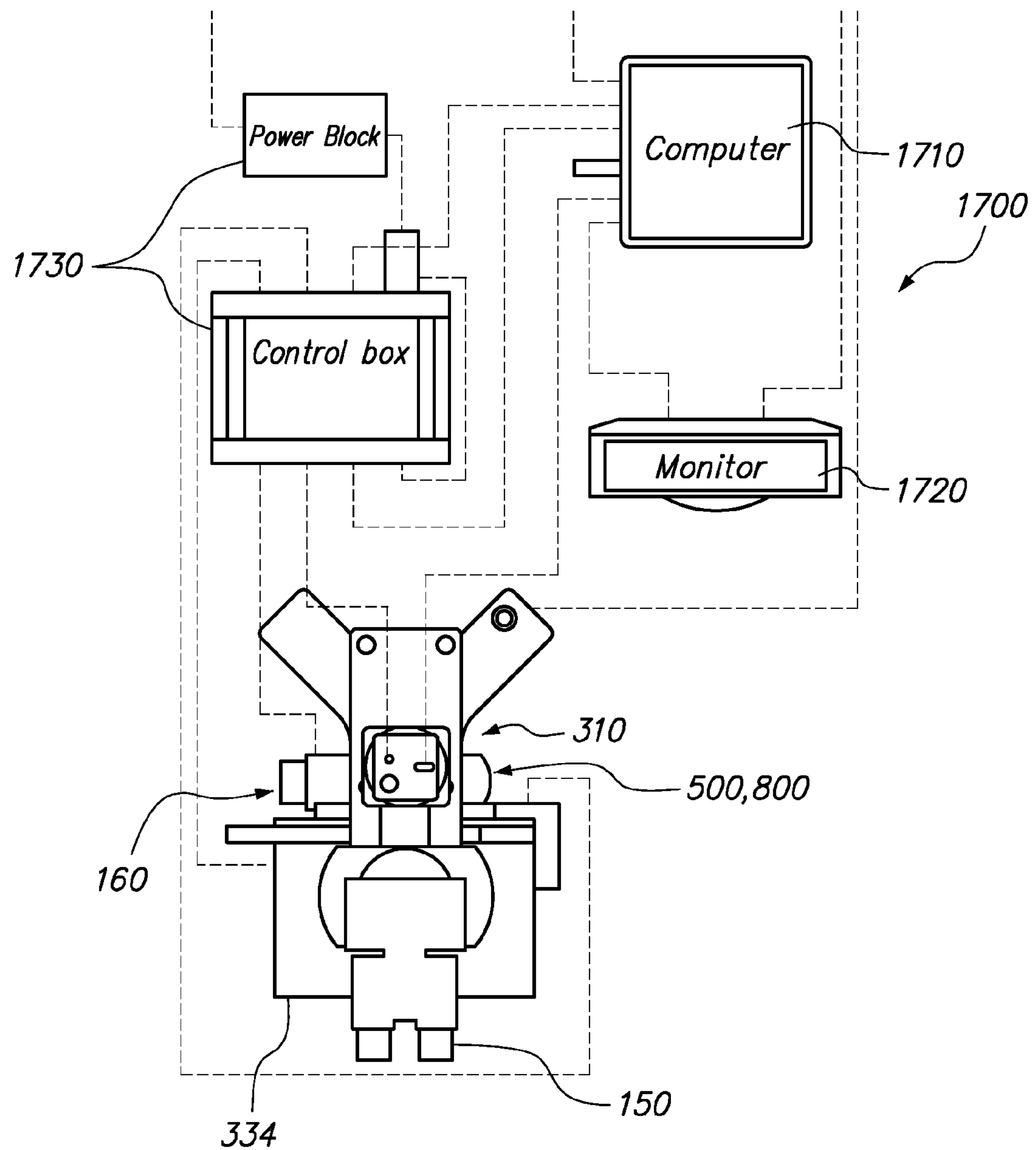
FIG. 17 illustrates an integrated imaging and review system in which microscope control embodiments of the present inventions may be implemented.
Figure 18:
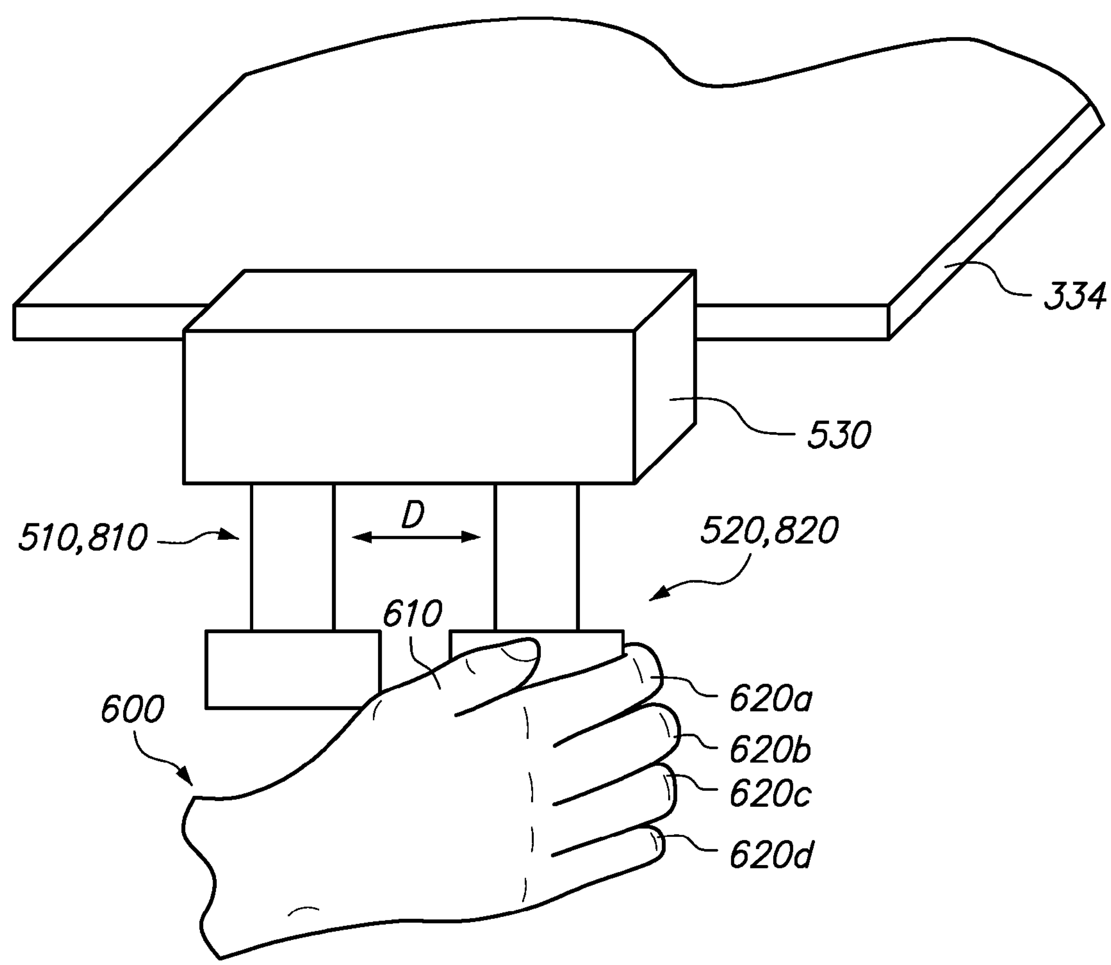
FIG. 18 illustrates a single-handed microscope control apparatus constructed according to another embodiment of the present inventions that allows a control element to be manipulated by a thumb and a finger of a user's hand to control review functions.

Further, referring to FIG. 17, embodiments may be implemented in various types of imaging and review systems, one example of which an integrated imaging/review microscope system 1700 that is configured to perform specimen imaging and to allow a user to review FOIs 1304 identified as a result of specimen imaging. With the system 1700 shown in FIG. 17, the same microscope may be used for imaging and reviewing individual biological specimens, one slide 200 at a time using a computer 1710, monitor or display 1720 and associated control components 1730.

Further, although certain embodiments are described with reference to manipulating a second controller 520, 820 by substantially or fully extending a user's index finger 620*a* while maintaining contact with a stage controller 510, 810, in alternative embodiments, systems may be configured such that a second controller 520, 820 used for controlling review functions may be separated from the first controller 510, 810 by a sufficiently large distance such that the second controller 520, 820 may be independently manipulated by the user. For this purpose, the distance D between the first and second controllers 810, 820 may be about three to four inches. For example, during use, a user may manipulate a first rotary controller 810 (e.g., as shown in FIG. 10), then move his or her hand 600 to the second rotary controller 820 as shown in FIG. 10. With this configuration, the user may manipulate the second rotary controller 820 using, for example, a thumb 610 and an index finger 620*a*, while the user's hand 600 may or may not contact with the first controller 810.

Figure 19:
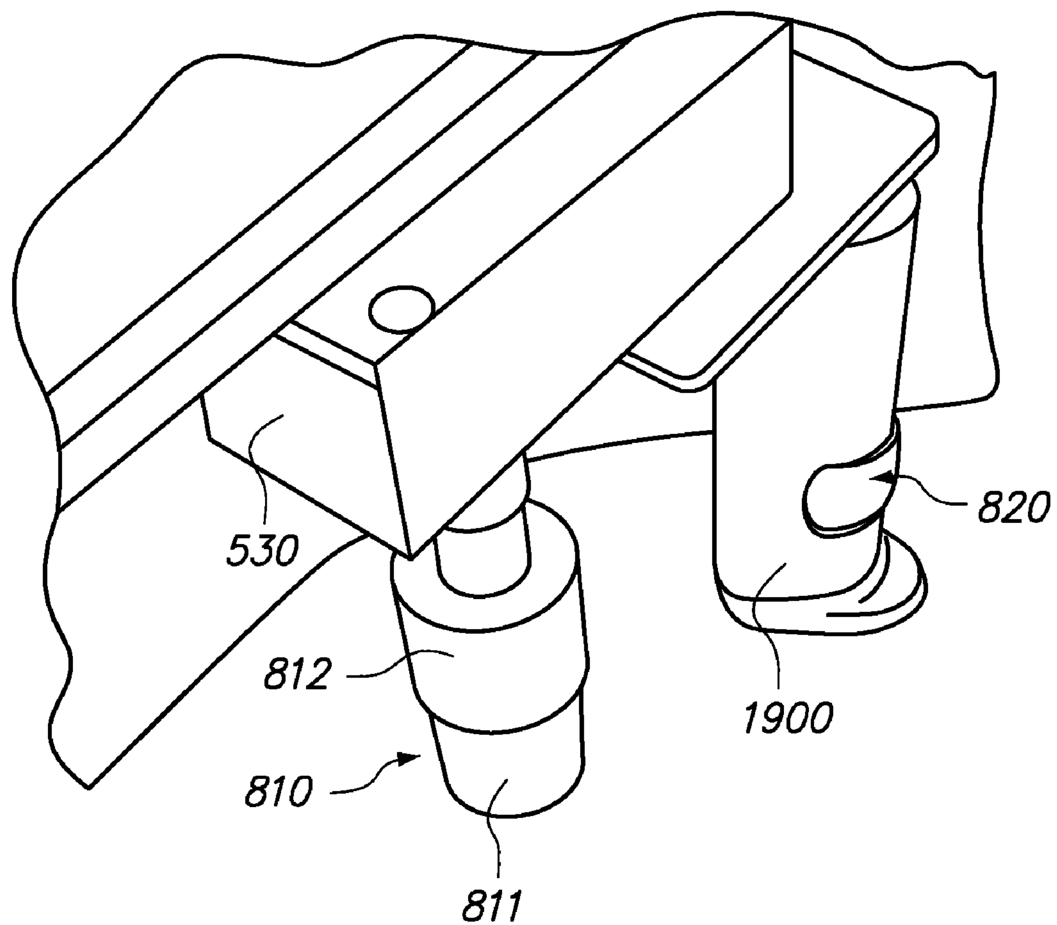
FIG. 19 illustrates a single-handled microscope control apparatus constructed according to another embodiment of the present inventions in which a second controller for controlling review functions is at least partially enclosed without a housing.

Further, although embodiments described above are shown with reference to figures showing the entire second controller 520, 820 being accessible by a user, e.g., the entire second controller 520, 820 being exposed, in practice, the second controller 520, 820 may be enclosed or surrounded by a cover or housing 1900 as shown in FIG. 19. A scroll wheel or other suitable second control component 520, 820 may extend through or be accessible through a housing 1900 aperture or window for manipulation by the user's hand 600.

It should also be understood that embodiments may be implemented in various other ways than the examples described above. For example, although embodiments are described with reference to a second controller being a second rotary controller 820, other controller configurations may be utilized. For example, rather than rotating the controller 820 to different FOIs 1304, the second controller may be configured such that the user's index finger 620 can push or otherwise actuate a switch or other actuator device such that the review scope 336 presents the next FOI 1304 each time the controller 820 is actuated, or may continue to scroll through FOIs 1304 while the controller 820 is depressed or actuated, until the controller 820 is released or inactive.

Further, it should be understood that the particular dimensions of components are provided as examples of how embodiments may be implemented, and in practice, the dimensions and forces for moving or actuating certain components may vary. Moreover, although embodiments are described with reference to extension of an index finger 620*a* to manipulate the second rotary controller 820, other extended fingers, and other numbers of extended fingers may also be used for this purpose, and the user's hand may or may not remain in contact with the first controller 510, 810 during manipulation of the second controller 520, 820.

Embodiments may also be implemented in various specimen processing systems, which may utilize different numbers of FOIs 1304, or group or identify portions of specimens or OOIs 1302 in other manners.

Figure 20A:
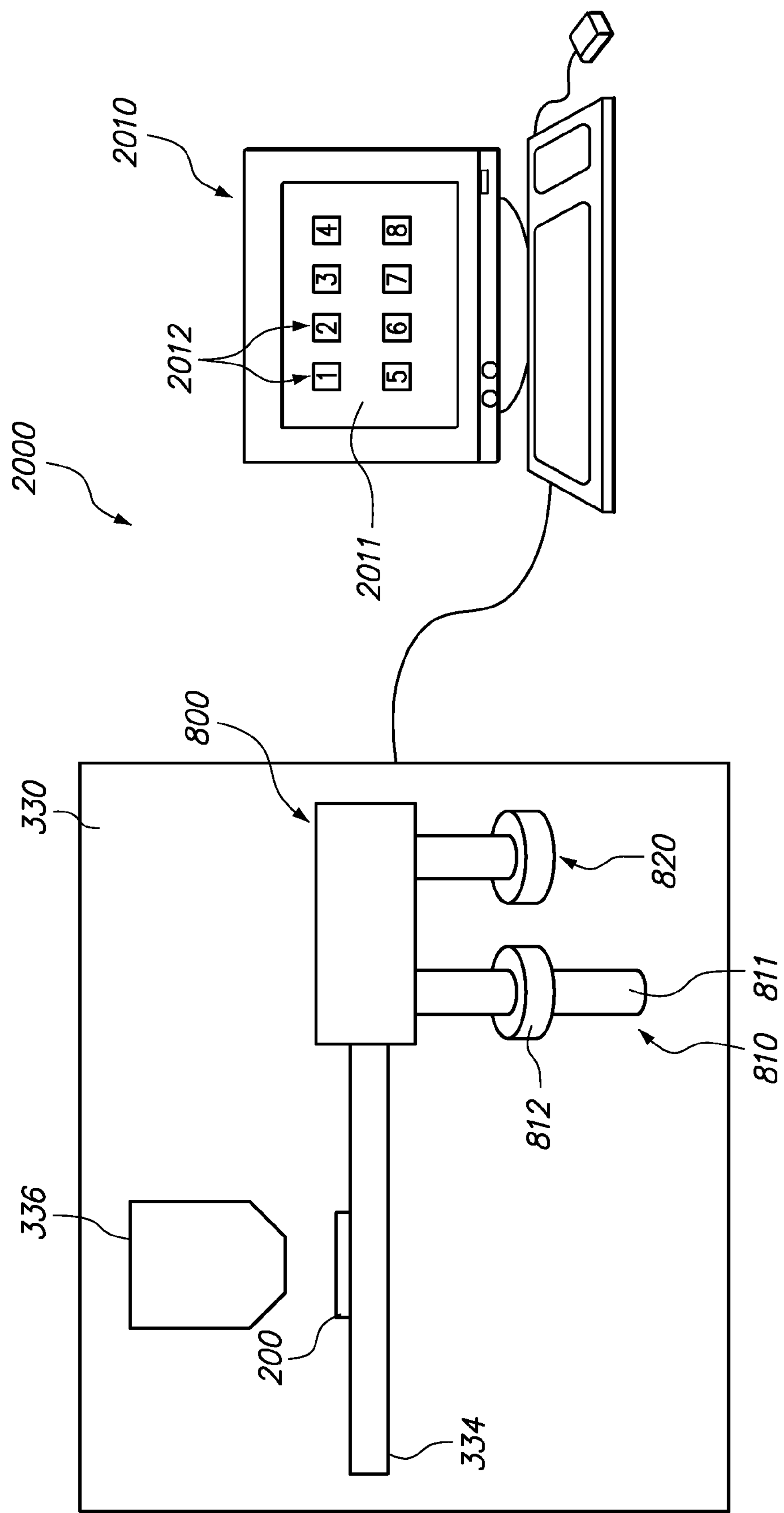
FIG. 20A illustrates a microscope system that includes a microscope control apparatus constructed according to yet another embodiment of the present inventions and operably coupled to a computer.
Figure 20B:
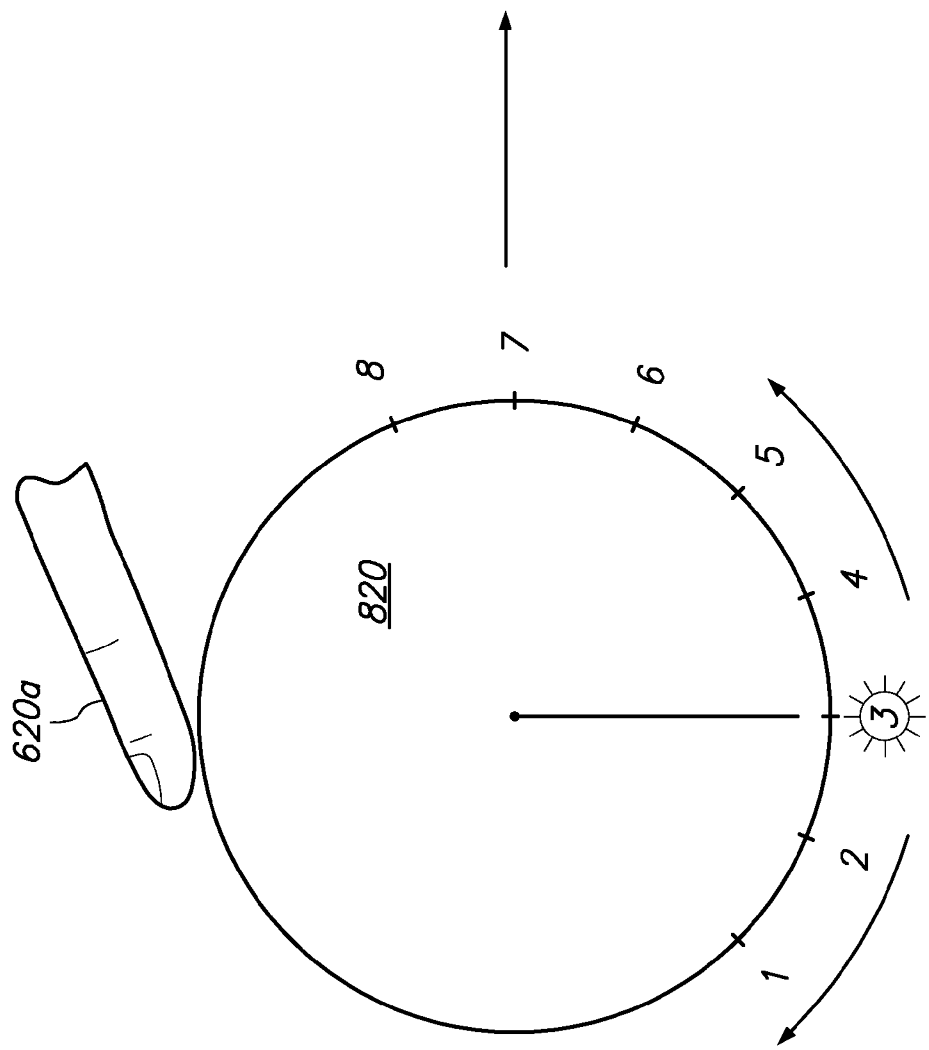
FIG. 20B illustrates how embodiments of the present inventions may be used to scroll through icons displayed on the computer shown in FIG. 20A.

Moreover, embodiments may also be implemented in other microscope environments and applications. For example, referring to FIGS. 20A-B, one system 2000 may include a review station 330 (e.g., as described above) that is operably coupled to a processing component or computer 2010 that includes a display, screen or monitor 2011 and other known components. Although the monitor 2011 is shown as an integral part of the computer 2010, the monitor 2011 may also be a separate component or associated with the computer 2010 in some manner. A number of icons 2012 may be displayed on monitor 2011, and when selected by a user, result in execution of different functions, which may or may not be related to review of a specimen using the review scope 336.

During use, a user may extend an index finger 620*a* to manipulate the second rotary controller 820 in order to scroll or highlight different icons 2012 displayed on the monitor 2011. After the desired icon 2012 is highlighted, the user can select the icon 2012 to execute the corresponding function. In one embodiment, an icon 2012 may represent a portion of the specimen 202 that can be marked by highlighting or selecting the corresponding icon 2012 using the second controller 520. For this purpose, the user may also use of an independent pushbutton (not shown), mouse 1813, or other suitable device. Selection of icons 2012 using the second controller 520, 820 may also control other functions and serve other purposes. In this manner, a control apparatus 800 adapted for use with a review microscope 336 may be utilized to select and launch various other functions by selecting icons 2012 using the second controller 520, 820, and the resulting functions may or may not be related to reviewing specimens 202.

Thus, embodiments are intended to cover alternatives, modifications, and equivalents that fall within the scope of the claims.

What is claimed is:

1. A review microscope, comprising:

an objective lens having a field of view;

a stage having a specimen slide disposed thereon;

a motor operatively coupled to the stage and configured to move the stage;

a processor operatively coupled to the motor and configured to control operation of the motor to thereby control movement of the stage;

coarse and fine focus controllers operatively coupled to the stage;

a control interface extending substantially horizontally from the stage;

a first rotary controller extending substantially vertically from the control interface and configured for manipulation by an extended finger of a single hand of an operator to cause the processor to automatically position the stage to present a previously identified object of interest on the specimen slide in the field of view of the objective lens; and a second rotary controller extending substantially vertically from the control interface and configured for manipulation by hand to further adjust a position of the stage to adjust a position of the object of interest within the field of view, wherein the first and second rotary controllers are arranged relative to each other to allow the extended finger to manipulate the first rotary controller, while the hand contacts the second rotary controller, wherein the second rotary controller is a coaxial rotary controller comprising a first rotary control element configured for moving the microscope stage in a first direction, and a second rotary control element coaxial with the first rotary control element and configured for moving the microscope stage in a second direction different than the first direction.

2. The microscope of claim 1, wherein the first rotary controller and the second rotary controller are rotatable about substantially parallel axes of rotation.

3. The microscope of claim 1, wherein the second rotary controller element is configured for manipulation by a thumb of the single hand, and the first rotary control element is configured for manipulation by at least one finger of the hand.

4. The microscope of claim 3, wherein the second rotary controller is configured for manipulation by an extended finger different from the at least one finger that is used for manipulation of the first rotary controller.

5. The microscope of claim 1, wherein the second rotary controller is further configured for manipulation by an index finger of the operator's hand while the index finger is not extended.

6. The microscope of claim 1, wherein the first rotary controller is a scroll wheel.

7. The microscope of claim 1, further comprising a switch associated with the first rotary controller and configured to be actuated as a result of displacement of the first rotary controller by the operator's extended finger to electronically mark a previously identified portion of the specimen slide.

8. The microscope of claim 7, wherein the first rotary controller and the switch are configured such that the switch is actuated by lateral displacement of the first rotary controller.

9. The microscope of claim 7, wherein the first rotary controller and the switch are configured such that the switch is actuated by vertical displacement of the first rotary controller.

10. The microscope of claim 1, wherein the first rotary controller is a rotary encoder.

11. The microscope of claim 10, wherein a position of the rotary encoder determines which previously identified portion of the specimen slide is presented to the operator.

12. A method of reviewing a specimen slide containing a plurality of previously identified objects of interest, the method comprising:

mounting the specimen slide on a stage of a review microscope;

rotating a first controller of the review microscope using an extended finger of a hand to cause a processor to automatically position the stage to present a previously identified object of interest on the specimen slide in a field of view of an objective lens of the microscope; and rotating a second controller using the hand to further adjust a position of the stage to thereby adjust a position of the object of interest within the field of view, wherein the first and second rotary controllers are arranged relative to each other to allow the extended finger to manipulate the first rotary controller while the hand contacts the second rotary controller.

13. The method of claim 12, further comprising displacing the first controller to electronically mark a previously identified portion of the specimen slide.

14. The microscope of claim 1, wherein the first rotary controller and the second rotary controller have different axes of rotation.

* * * * *